United States Patent [19]
Hrusecky

[11] Patent Number: 5,973,740
[45] Date of Patent: Oct. 26, 1999

[54] MULTI-FORMAT REDUCED MEMORY VIDEO DECODER WITH ADJUSTABLE POLYPHASE EXPANSION FILTER

[75] Inventor: David A. Hrusecky, Johnson City, N.Y.

[73] Assignee: International Business Machines Corporation, Armonk, N.Y.

[21] Appl. No.: 09/015,463

[22] Filed: Jan. 29, 1998

Related U.S. Application Data

[63] Continuation-in-part of application No. 08/958,632, Oct. 27, 1997.

[51] Int. Cl.$^6$ ................................................ H04N 7/50
[52] U.S. Cl. ................................ 348/401; 348/416
[58] Field of Search ................................ 348/401, 390, 348/391, 392, 394, 395, 396, 398, 399, 400, 402, 408, 420, 416, 423, 424, 425, 440, 445, 458, 459, 427, 845, 715, 716; H04N 7/50

[56] References Cited

U.S. PATENT DOCUMENTS

| | | | |
|---|---|---|---|
| 4,694,413 | 9/1987 | Arbeiter | 364/724 |
| 4,723,318 | 2/1988 | Marshall | 455/109 |
| 4,918,524 | 4/1990 | Ansari et al. | 358/133 |
| 4,991,167 | 2/1991 | Petri et al. | 370/32.1 |
| 5,274,372 | 12/1993 | Luthra et al. | 341/61 |
| 5,297,236 | 3/1994 | Antill et al. | 395/2.12 |
| 5,477,397 | 12/1995 | Naimpally | 386/111 |
| 5,504,785 | 4/1996 | Becker et al. | 375/344 |
| 5,535,008 | 7/1996 | Yamagishi | 386/109 |
| 5,576,765 | 11/1996 | Cheney et al. | 348/407 |
| 5,610,942 | 3/1997 | Chen et al. | 375/242 |
| 5,610,944 | 3/1997 | Mau et al. | 375/260 |
| 5,612,975 | 3/1997 | Becker et al. | 375/319 |
| 5,614,952 | 3/1997 | Boyce | 348/392 |
| 5,777,679 | 7/1998 | Cheney | 348/401 |
| 5,862,268 | 1/1999 | Boehlke | 348/458 |

*Primary Examiner*—Howard Britton
*Attorney, Agent, or Firm*—Heslin & Rothenberg, P.C.

[57] ABSTRACT

A digital signal decoder system is provided for receiving digital video signals and processing them while reducing the external memory requirements for frame buffer storage for an MPEG-2 decoder through decimation. The system includes an expansion filter, such as a polyphase finite impulse response (FIR) horizontal filter for re-expanding decimated macroblock data to original form. This expansion filter is a variable filter which automatically adjusts expansion of the decimated macroblock data using the decimation factor employed by the decimation unit of the digital video decoding system. The automatically adjusting of expansion includes dividing the upsample ratio of the filter by the decimation factor received from the decimation unit. The expansion filter also includes a predefined phase correction associated with the decimation factor and style employed by the decimation unit. The predefined phase correction ensures spatial accuracy of macroblock data output from the expansion filter. The filter may alternatively comprise a high frequency filter for filtering high frequency affects from decimated macroblock data, e.g., when the digital video decoder system is sending decimated macroblock data to an associated display unit for display in decimated form.

29 Claims, 15 Drawing Sheets

```
X X X X X X X X X X X X X ← LINE 1
O   O   O   O   O   O   O
X X X X X X X X X X X X X ← LINE 2

X X X X X X X X X X X X X ← LINE 3
O   O   O   O   O   O   O
X X X X X X X X X X X X X ← LINE 4
     X REPRESENTS LUMINANCE SAMPLES
     O REPRESENTS CHROMINANCE SAMPLES
```

*fig. 6*

```
⊗ X ⊗ X ⊗ X ⊗ X ⊗ X ⊗ X ⊗ ← LINE 1
⊗ X ⊗ X ⊗ X ⊗ X ⊗ X ⊗ X ⊗ ← LINE 2
⊗ X ⊗ X ⊗ X ⊗ X ⊗ X ⊗ X ⊗ ← LINE 3
⊗ X ⊗ X ⊗ X ⊗ X ⊗ X ⊗ X ⊗ ← LINE 4
     X REPRESENTS LUMINANCE SAMPLES
     O REPRESENTS CHROMINANCE SAMPLES
```

*fig. 7*

```
X  X  X  X  X  X  X  X  X  X  X  X
O     O     O     O     O     O
     X REPRESENTS LUMINANCE SAMPLES
     O REPRESENTS CHROMINANCE SAMPLES
```

*fig. 8*

```
X  X  X  X  X  X  X  X  X  X  X  X
   O     O     O     O     O     O
     X REPRESENTS LUMINANCE SAMPLES
     O REPRESENTS CHROMINANCE SAMPLES
```

*fig. 9*

```
STARTING POINT
             Y0                      YI                      Y2
             U0                                              U0
             V0                                              V0

ORIGINAL     X                       X                       X
             0                                               0

RESULT       X      0      X         X       0       X       X
             |◄──►|
      KEY:   └────────── SUB_PEL_DELTA
                    X = LUMINANCE
                    0 = CHROMINANCE
``` fig. 11

```
                        + -0.0000 Y OFFSET
BOUNDARY
CONDITIONS              EDGE OF PICTURE

Y-PEL PHASE #      →  0123456789abcdef0123456789abcdef0123456789abcdef
OFFSET ORIG PIXEL  →  Y0...0...0...0...y1..0...0...0...y2..0...0...0...y3
0.0000                0       6       c       4       a
0.0001                 1       7       d       5       b
0.0010                  2       8       e       6       c
0.0011                   3       9       f       7       d
0.0100                    4       a       0       8       e
0.0101                     5       b       1       9       f
0.0110                      6       c       2       a       .
0.0111                       7       d       3       b       .
0.1000                        8       e       4       .  ← (4TH PEL)
0.1001                         9       f       5       .    .
0.1010 STARTING PHASE FOR Y →   a       0       6       .    .
0.1011 (FIRST PEL)               b       1       7   ← (3RD PEL)
0.1100                            c       2       8
0.1101                             d       3       .
0.1110                              e       4
0.1111                               f       5  ← PROGRESSING
1.0000                                0       6     PHASES FOR Y
1.0001                                 1       7    (2d PEL)
1.0010                                  2       8
1.0011 Y START PHASE = YPEL OFFSET       3       9
1.0100                                    4       a
1.0101                                     5       b
1.0110                                      6       c
1.0111                                       7       d
1.1000                                        8       e
1.1001                                         9       f
1.1010                                          a       0
1.1011                                           b       1
1.1100                                            c       2
1.1101                                             d       3
1.1110                                              e       4
1.1111                                               f       5
2.0000                                                0       6
```

*fig. 12a*

```
                            + -0.0000 UV OFFSET
BOUNDARY                    |
CONDITIONS                  EDGE OF PICTURE
                            |
UV-PEL    PHASE #  →   0 1 2 3 4 5 6 7 8 9 a b c d e f 0 1 2 3 4 5 6 7 8
OFFSET    ORIG  PIXEL →  UV . . . 0 . . . 0 . . . 0 . . . UV . . . 0 . . . 0
0.0000                   0 1           7           d           1
0.0001                     1           7           d
0.0010                       2           8           e
0.0011                       2           8           e
0.0100                         3           9           f          ← (3RD PEL)
0.0101                         3           9           f
0.0110                           4           a           .
0.0111                           4           a           .
0.1000                             5           b          ← PROGRESSING PHASES
0.1001                             5           b             FOR UV (2nd PEL)
0.1010                               6           c
0.1011                               6           c
0.1100                                 7           d
0.1101                                 7           d
0.1110                                   8           .
0.1111     STARTING PHASE FOR UV  →      8           .
1.0000     (FIRST PEL)                     9           .
1.0001                                     9           .
1.0010                                       a           .
1.0011                                       a           .
1.0100                                         b           .
1.0101                                         b           .
1.0110                                           c
1.0111                                           c
1.1000                                             d
1.1001                                             d
1.1010                                               e
1.1011                                               e
1.1100                                                 f
1.1101  - - - - - - - - - - - - - - - - - - - - - - - - - - - - - -
1.1110          | EXTRA U & V INITIAL SHIFT         0
1.1111          | REQUIRED DUE TO PROGRESSION       0
2.0000          ▼ OF PHASES                         1
```

*fig. 12b*

ASSEMBLE FIG. 15 AS SHOWN

MULTI-FORMAT REDUCED MEMORY VIDEO DECODER WITH ADJUSTABLE POLYPHASE EXPANSION FILTER

CROSS-REFERENCE TO RELATED APPLICATIONS

This application comprises a continuation-in-part patent application from commonly assigned, U.S. patent application by Cheney et al. entitled "Multi-Format Reduced Memory MPEG-2 Compliant Decoder," Ser. No. 08/958,632, filed Oct. 27, 1997, the entirety of which is hereby incorporated herein by reference. Further, this application is related to commonly assigned, co-pending U.S. patent application by Cheney et al. entitled "Video Decoder Including Polyphase FIR Horizontal Filter," Ser. No. 08/616,327, now U.S. Pat. No. 5,777,679 the entirety of which is also hereby incorporated herein by reference.

TECHNICAL FIELD

The present invention is directed generally to digital video signal processing, and more particularly, to an enhanced expansion filter for use in a multi-format reduced memory digital video decoder. The expansion filter is coupled to the macroblock data decimation unit within the decode system and automatically adjusts data expansion based on decimation information received therefrom.

BACKGROUND OF THE INVENTION

The MPEG-2 standard describes an encoding method that results in substantial bandwidth reduction by a subjective lossy compression followed by a lossless compression. The encoded, compressed digital data is subsequently decompressed and decoded in an MPEG-2 compliant decoder. Video decoding in accordance with the MPEG-2 standard is described in detail in commonly assigned U.S. Pat. No. 5,576,765, entitled "Video Decoder" which is hereby incorporated herein by reference in its entirety.

Video decoders are typically embodied as general or special purpose processors and memory. For a conventional MPEG-2 decoder, two decoded reference frames are typically stored in memory at the same time. Thus, the cost of memory can often dominate the cost of the decode system. For example, an MPEG-2 video decoder might employ 2 MB or more of external memory, which generally comprises Dynamic Random Access Memory (DRAM). External memory is used for various data areas, or buffers such as frame buffers.

In practice, the MPEG-2 video decoder is typically limited to 2 MB of external memory in order to minimize cost of the end product. The decoder must perform all of its functions within this limitation. For example, of particular importance is enabling output for both the European market which utilizes the PAL standard of 576 video scan lines and the U.S. market which utilizes the NTSC standard of 480 video scan lines.

The MPEG-2 decompressed video data buffers, also called frame buffers, consume the largest part of external DRAM, therefore they are the prime candidate for memory reduction/compression. However, because the frame buffers contain final pixel display and MPEG reference data, any storage reduction technique must retain high video fidelity in the frame buffers.

Another obstacle faced in video compression/ decompression is being able to transform pictures between different sized screens. For example, a motion picture screen is in 16:9 format, while a television screen is in 4:3 format. As a result, a method must be provided to convert between 16:9 and 4:3 form factors. This need is discussed in the above-incorporated, pending U.S. Application entitled "Multi-Format Reduced Memory MPEG-2 Compliant Decoder," which is described further herein.

In view of the above, and in order to establish commercial advantage, a technique is desired for implementing an enhanced and variable expansion filter within a multi-format reduced memory MPEG-2 compliant decoder. The filter is to be used for returning decimated data within the decoder to original format, e.g., for display. The present invention addresses this need.

DISCLOSURE OF THE INVENTION

Briefly described, the present invention comprises in a first aspect an expansion filter for expanding decimated macroblock data within a digital video decoding system employing a macroblock data decimation unit to decimate decoded macroblock data pursuant to a decimation factor. The expansion filter comprises a variable filter for expanding the decimated macroblock data to original format. The variable filter receives the decimated macroblock data, and is coupled to the macroblock data decimation unit for receiving the decimation factor used by the decimation unit. The variable filter includes means for automatically adjusting expansion of the decimated macroblock data using the decimation factor information received from the macroblock data decimation unit.

In another aspect, the invention comprises a digital video decoding system which includes a macroblock data decimation unit and an expansion filter. The macroblock data decimation unit is configured to decimate macroblock data after the decoding thereof. This decimating of data is pursuant to a decimation factor. The expansion filter is configured to expand decimated macroblock data and is coupled to the macroblock data decimation unit for receiving the decimation factor used by the decimation unit in decimating the macroblock data. The expansion filter includes a predefined phase correction based upon the decimation factor employed by the decimation unit. This predefined phase correction is employed by the expansion filter in expanding the decimated macroblock data to ensure spatial accuracy of macroblock data output from the expansion filter.

In still another aspect, a digital video decoding system is presented which includes a video decoder controller, a macroblock data decimation unit and a filter. The video decoder controller is provided for controlling decimation and re-expansion of macroblock data. The macroblock data decimation unit decimates original macroblock data after the decoding thereof. The filter is coupled to the macroblock data decimation unit and to the video decoder controller and operates as either an expansion filter or as a high frequency filter pursuant to control signals received from the video decoder controller. When operating as an expansion filter, the filter returns the decimated macroblock data to approximately original macroblock data, and when operating as a high frequency filter, the filter removes high frequency effects from the decimated macroblock data. The high frequency filter is particularly useful when the digital video decoder system is sending the decimated macroblock data to an associated display unit for display in decimated form.

Macroblock data processing methods corresponding to each of the above-summarized aspects of this invention are also described and claimed herein.

To restate, the automatic adjustment of expansion and phase compensation aspects of the present invention provide a more accurate reconstruction of the picture originally decoded by the MPEG-2 digital video decoder system. While the enhancements presented herein are precise, being accurate to the sub-pel level, which may not be visible to the average consumer, an MPEG-2 decoder chip manufacturer delivers to many different types of digital video system manufacturers. Therefore, this additional accuracy provided by the present invention may be a deciding factor in achieving commercial success. In the related aspect of high frequency filtering, an expansion filter in accordance with this invention functions to save chip area. By reusing the expansion filter already included in the digital video decoder system as a high frequency filter, especially in cases where the size parameters of the input MPEG stream do not require any resealing, the cost of a special filter otherwise needed for pre-conditioning the input to the decimation process is avoided. In this case, the expansion filter at the output approximates the pre-conditioning high frequency filter effect.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which:

FIG. 6 shows the position of luminance and chrominance signals in 4:2:0 format;

FIG. 7 shows the position of luminance and chrominance signals in 4:2:2 format;

FIG. 8 shows the horizontal position of MPEG-2 chrominance signals for 4:2:0 format;

FIG. 9 shows the horizontal position of MPEG-1 chrominance signals for 4:2:0 format;

FIG. 11 depicts horizontal spatial centering of chrominance signals with respect to the resulting luminance signals in an 8:16 filtering;

FIG. 12a shows an example of subpel and odd pel offsets versus the starting phase with a 6.0:16 expansion rate of luminance;

FIG. 12b shows the corresponding example of subpel and odd pel offsets versus the starting phase with a 6.0:16 expansion rate of chrominance;

FIGS. 15, 15a & 15b depict one embodiment of phase calculation hardware comprising an expansion filter pursuant to the present invention, including starting phase for pan scan mode.

BEST MODE FOR CARRYING OUT THE INVENTION

As the present invention may be applied in connection with an MPEG-2 decoder, in order to facilitate an understanding of the invention, some pertinent aspects of the MPEG-2 compression algorithm are first reviewed. It is to be noted, however, that the invention can also be applied to other video coding algorithms which share some of the features of the MPEG-2 algorithm.

To begin with, it will be understood that the compression of a data object, such as a page of text, an image, a segment of speech, or a video sequence, can be thought of as a series of steps, including: 1) a decomposition of that object into a collection of tokens; 2) the representation of those tokens by binary strings which have minimal length in some sense; and 3) the concatenation of the strings in a well-defined order. Steps 2 and 3 are lossless, i.e., the original data is faithfully recoverable upon reversal, and Step 2 is known as entropy coding. Step 1 can be either lossless or lossy in general. Most video compression algorithms are lossy because of stringent bit-rate requirements. A successful lossy compression algorithm eliminates redundant and irrelevant information, allowing relatively large errors where they are not likely to be visually significant and carefully representing aspects of a sequence to which the human observer is very sensitive. The techniques employed in the MPEG-2 algorithm for Step 1 can be described as predictive/interpolative motion-compensated hybrid DCT/DPCM coding. Huffman coding, also known as variable length coding, is used in Step 2.

The MPEG-2 video standard specifies a coded representation of video for transmission as set forth in ISO-IEC JTC1/SC29/WG11, Generic Coding of Moving Pictures and Associated Audio Information: Video, International Standard, 1994. The algorithm is designed to operate on interlaced or non-interlaced component video. Each picture has three components: luminance (Y), red color difference (Cr), and blue color difference (Cb). The video data may be coded in 4:4:4 format, in which case there is one Cr and one Cb sample for each Y sample, in 4:2:2 format, in which case there are half as many Cr and Cb samples as luminance samples in the horizontal direction, or in 4:2:0 format, in which case there are half as many Cr and Cb samples as luminance samples in both the horizontal and vertical directions.

Figure 1:
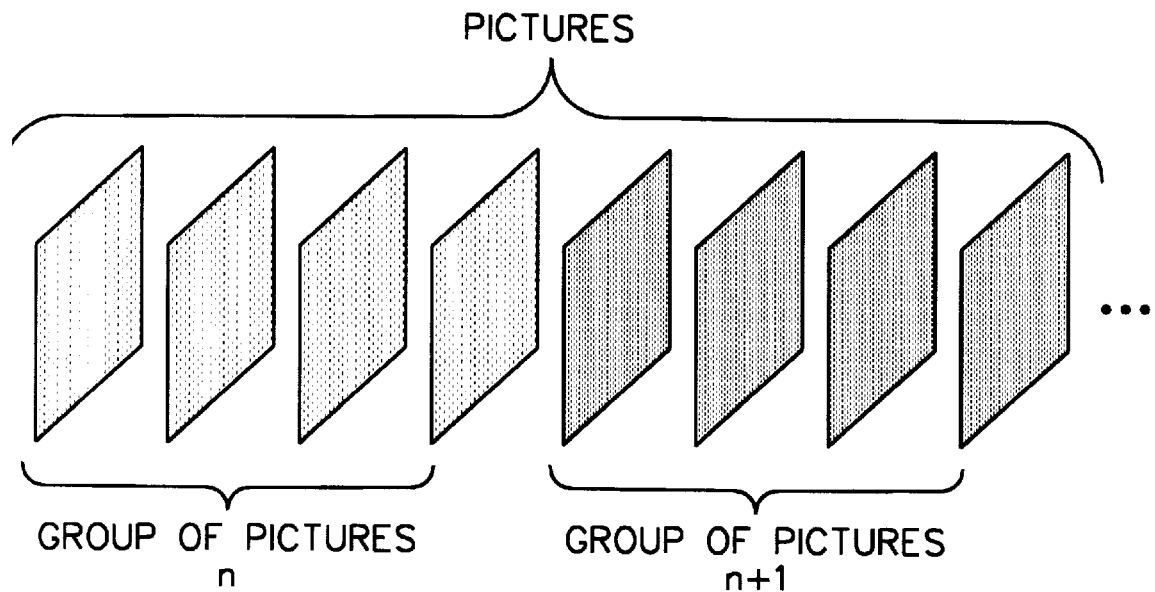
FIG. 1 shows an exemplary pair of groups of pictures (GOPs)
Figure 2:
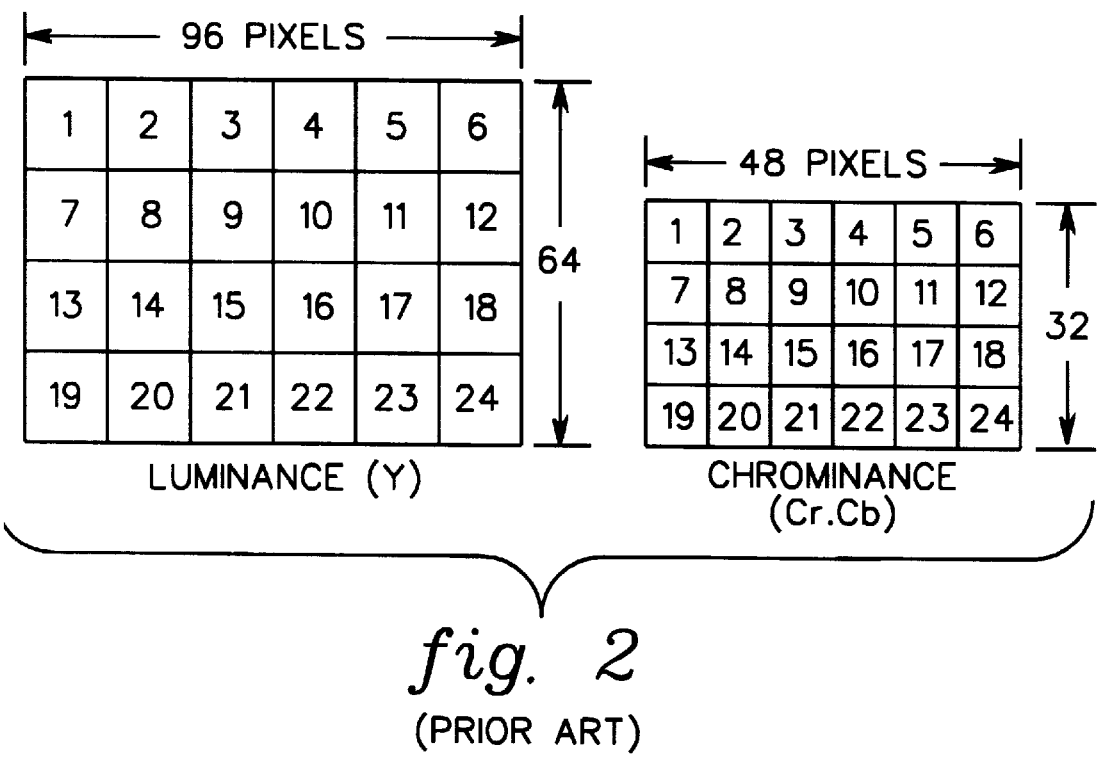
FIG. 2 shows an exemplary macroblock (MB) subdivision of a picture (4:2:0 format)

An MPEG-2 data stream consists of a video stream and an audio stream which are packed, together with systems information and possibly other bitstreams, into a systems data stream that can be regarded as layered. Within the video layer of the MPEG-2 data stream, the compressed data is further layered. A description of the organization of the layers will aid in understanding the invention. These layers of the MPEG-2 Video Layered Structure are shown in FIGS. 1 & 2. The layers pertain to the operation of the compression algorithm as well as the composition of a compressed bit stream. The highest layer is the Video Sequence Layer, containing control information and parameters for the entire sequence. At the next layer, a sequence is subdivided into sets of consecutive pictures, each known as a "Group of Pictures" (GOP). A general illustration of this layer is shown in FIG. 1. Decoding may begin at the start of any GOP, essentially independent of the preceding GOPs. There is no limit to the number of pictures which may be in a GOP, nor do there have to be equal numbers of pictures in all GOPs.

The third or Picture layer is a single picture. A general illustration of this layer is shown in FIG. 2. The luminance component of each picture is subdivided into 16×16 regions; the color difference components are subdivided into appropriately sized blocks spatially co-sited with the 16×16 luminance regions; for 4:4:4 video, the color difference components are 16×16, for 4:2:2 video, the color difference components are 8×16, and for 4:2:0 video, the color difference components are 8×8. Taken together, these co-sited luminance region and color difference regions make up the fifth layer, known as a "macroblock" (MB). Macroblocks in a picture are numbered consecutively in lexicographic order, starting with Macroblock 1.

Between the Picture and MB layers is the fourth or "slice" layer. Each slice consists of some number of consecutive MB's. Finally, each MB consists of four 8×8 luminance blocks and 8, 4, or 2 (for 4:4:4, 4:2:2 and 4:2:0 video) chrominance blocks. The Sequence, GOP, Picture, and slice layers all have headers associated with them. The headers begin with byte-aligned Start Codes and contain information pertinent to the data contained in the corresponding layer.

A picture can be either field-structured or frame-structured. A frame-structured picture contains information to reconstruct an entire frame, i.e., the combination of one field containing the odd lines and the other field containing the even lines. A field-structured picture contains information to reconstruct one field. If the width of each luminance frame (in picture elements or pixels) is denoted as C and the height as R (C is for columns, R is for rows), a field-structured picture contains information for C×R/2 pixels.

The two fields in a frame are the top field and the bottom field. If we number the lines in a frame starting from 1, then the top field contains the odd lines (1, 3, 5, . . . ) and the bottom field contains the even lines (2, 4, 6, . . . ). Thus we may also call the top field the odd field, and the bottom field the even field.

A macroblock in a field-structured picture contains a 16×16 pixel segment from a single field. A macroblock in a frame-structured picture contains a 16×16 pixel segment from the frame that both fields compose; each macroblock contains a 16×8 region from each of the two fields.

Within a GOP, three types of pictures can appear. The distinguishing difference among the picture types is the compression method used. The first type, Intramode pictures or I-pictures, are compressed independently of any other picture. Although there is no fixed upper bound on the distance between I-pictures, it is expected that they will be interspersed frequently throughout a sequence to facilitate random access and other special modes of operation. Predictively motion-compensated pictures (P pictures) are reconstructed from the compressed data in that picture plus two reconstructed fields from previously displayed I or P pictures. Bidirectionally motion-compensated pictures (B pictures) are reconstructed from the compressed data in that picture plus two reconstructed fields from previously displayed I or P pictures and two reconstructed fields from I or P pictures that will be displayed in the future. Because reconstructed I or P pictures can be used to reconstruct other pictures, they are called reference pictures.

With the MPEG-2 standard, a frame can be coded either as a frame-structured picture or as two field-structured pictures. If a frame is coded as two field-structured pictures, then both fields can be coded as I pictures, the first field can be coded as an I picture and the second field as a P picture, both fields can be coded as P pictures, or both fields can be coded as B pictures.

If a frame is coded as a frame-structured I picture, as two field-structured I pictures, or as a field-structured I picture followed by a field-structured P picture, we say that the frame is an I frame; it can be reconstructed without using picture data from previous frames. If a frame is coded as a frame-structured P picture or as two field-structured P pictures, we say that the frame is a P frame; it can be reconstructed from information in the current frame and the previously coded I or P frame. If a frame is coded as a frame-structured B picture or as two field-structured B pictures, we say that the frame is a B frame; it can be reconstructed from information in the current frame and the two previously coded I or P frames (i.e., the I or P frames that will appear before and after the B frame). We refer to I or P frames as reference frames.

A common compression technique is transform coding. In MPEG-2 and several other compression standards, the discrete cosine transform (DCT) is the transform of choice. The compression of an I-picture is achieved by the steps of 1) taking the DCT of blocks of pixels, 2) quantizing the DCT coefficients, and 3) Huffman coding the result. In MPEG-2, the DCT operation converts a block of n×n pixels into an n×n set of transform coefficients. Like several of the international compression standards, the MPEG-2 algorithm uses a DCT block size of 8×8. The DCT transformation by itself is a lossless operation, which can be inverted to within the precision of the computing device and the algorithm with which it is performed.

The second step, quantization of the DCT coefficients, is the primary source of lossiness in the MPEG-2 algorithm. Denoting the elements of the two-dimensional array of DCT coefficients by cmn, where m and n can range from 0 to 7, aside from truncation or rounding corrections, quantization is achieved by dividing each DCT coefficient cmn by wmn times QP, with wmn being a weighting factor and QP being the quantizer parameter. The weighting factor wmn allows coarser quantization to be applied to the less visually significant coefficients. The quantizer parameter QP is the primary means of trading off quality vs. bit-rate in MPEG-2. It is important to note that QP can vary from MB to MB within a picture.

Following quantization, the DCT coefficient information for each MB is organized and coded, using a set of Huffman codes. As the details of this step are not essential to an understanding of the invention and are generally understood in the art, no further description is needed here Most video sequences exhibit a high degree of correlation between consecutive pictures. A useful method to remove this redundancy prior to coding a picture is "motion compensation". MPEG-2 provides tools for several methods of motion compensation.

The methods of motion compensation have the following in common. For each macroblock, one or more motion vectors are encoded in the bit stream. These motion vectors allow the decoder to reconstruct a macroblock, called the predictive macroblock. The encoder subtracts the "predictive" macroblock from the macroblock to be encoded to form the "difference" macroblock. The encoder uses tools to compress the difference macroblock that are essentially similar to the tools used to compress an intra macroblock.

The type of a picture determines the methods of motion compensation that can be used. The encoder chooses from among these methods for each macroblock in the picture. If no motion compensation is used, the macroblock is intra (I). The encoder can make any macroblock intra. In a P or a B picture, forward (F) motion compensation can be used; in this case, the predictive macroblock is formed from data in the previous I or P frame. In a B picture, backward (B) motion compensation can also be used; in this case, the predictive macroblock is formed from data in the future I or P frame. In a B picture, forward/backward (FB) motion compensation can also be used; in this case, the predictive macroblock is formed from data in the previous I or P frame and the future I or P frame.

Because I and P pictures are used as references to reconstruct other pictures (B and P pictures) they are called reference pictures. Because two reference frames are needed to reconstruct B frames, MPEG-2 decoders typically store two decoded reference frames in memory.

Aside from the need to code side information relating to the MB mode used to code each MB and any motion vectors associated with that mode, the coding of motion-compensated macroblocks is very similar to that of intra-mode MBs. Although there is a small difference in the quantization, the model of division by wmn times QP still holds.

The MPEG-2 algorithm can be used with fixed bit-rate transmission media. However, the number of bits in each picture will not be exactly constant, due to the different types of picture processing, as well as the inherent variation with time of the spatio-temporal complexity of the scene being coded. The MPEG-2 algorithm uses a buffer-based rate control strategy to put meaningful bounds on the variation allowed in the bit-rate. A Video Buffer Verifier (VBV) is devised in the form of a virtual buffer, whose sole task is to place bounds on the number of bits used to code each picture so that the overall bit-rate equals the target allocation and the short-term deviation from the target is bounded. This rate control scheme can be explained as follows. Consider a system consisting of a buffer followed by a hypothetical decoder. The buffer is filled at a constant bit-rate with compressed data in a bit stream from the storage medium. Both the buffer size and the bit-rate are parameters which are transmitted in the compressed bit stream. After an initial delay, which is also derived from information in the bit stream, the hypothetical decoder instantaneously removes from the buffer all of the data associated with the first picture. Thereafter, at intervals equal to the picture rate of the sequence, the decoder removes all data associated with the earliest picture in the buffer.

Figure 3:
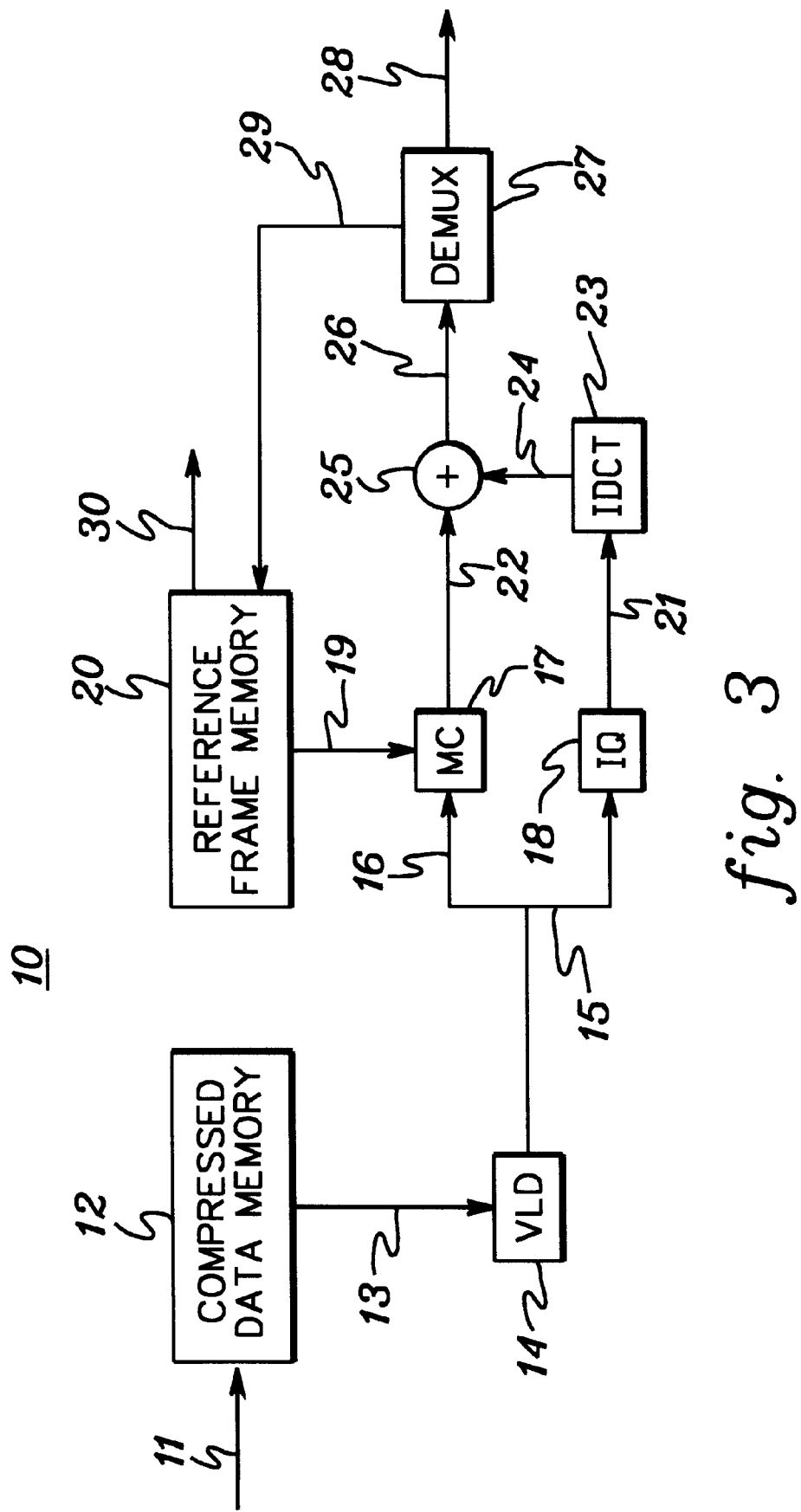
FIG. 3 depicts a block diagram of a video decoder.

FIG. 3 shows a diagram of a conventional video decoder. The compressed data enters as signal 11 and is stored in the compressed data memory 12. The variable length decoder (VLD) 14 reads the compressed data as signal 13 and sends motion compensation information as signal 16 to the motion compensation (MC) unit 17 and quantized coefficients as signal 15 to the inverse quantization (IQ) unit 18. The motion compensation unit reads the reference data from the reference frame memory 20 as signal 19 to form the predicted macroblock, which is sent as the signal 22 to the adder 25. The inverse quantization unit computes the unquantized coefficients, which are sent as signal 21 to the inverse transform (IDCT) unit 23. The inverse transform unit computes the reconstructed difference macroblock as the inverse transform of the unquantized coefficients. The reconstructed difference macroblock is sent as signal 24 to the adder 25, where it is added to the predicted macroblock. The adder 25 computes the reconstructed macroblock as the sum of the reconstructed difference macroblock and the predicted macroblock. The reconstructed macroblock is then sent as signal 26 to the demultiplexer 27, which stores the reconstructed macroblock as signal 29 to the reference memory if the macroblock comes from a reference picture or sends it out (to memory or display) as signal 28. Reference frames are sent out as signal 30 from the reference frame memory.

Various techniques have been proposed for reducing memory requirements of a decode system by storing decoded video data in compressed form. One such technique is described in the above-incorporated pending patent application entitled "Multi-Format Reduced Memory MPEG-2 Compliant Decoder," Ser. No. 08/958,632. This co-pending application relates to a method for reducing memory requirements for frame buffer storage for an MPEG-2 decoder, and to editing or modifying the video output, e.g., from a 4:3 form factor of television to a 16:9 format of motion pictures. A significant aspect of the technique is decimation of the B-coded pictures within hardware of the video decoder. This technique includes first motion compensating the P-coded and B-coded pictures, followed by decimating the B-coded pictures during the decode phase, and increasing the size of scan line fetches for the I-coded and P-coded pictures to enable their horizontal decimation during the display phase. The present invention is directed to an enhanced expansion filter for use in an original video system as described in this co-pending application.

Figure 4:
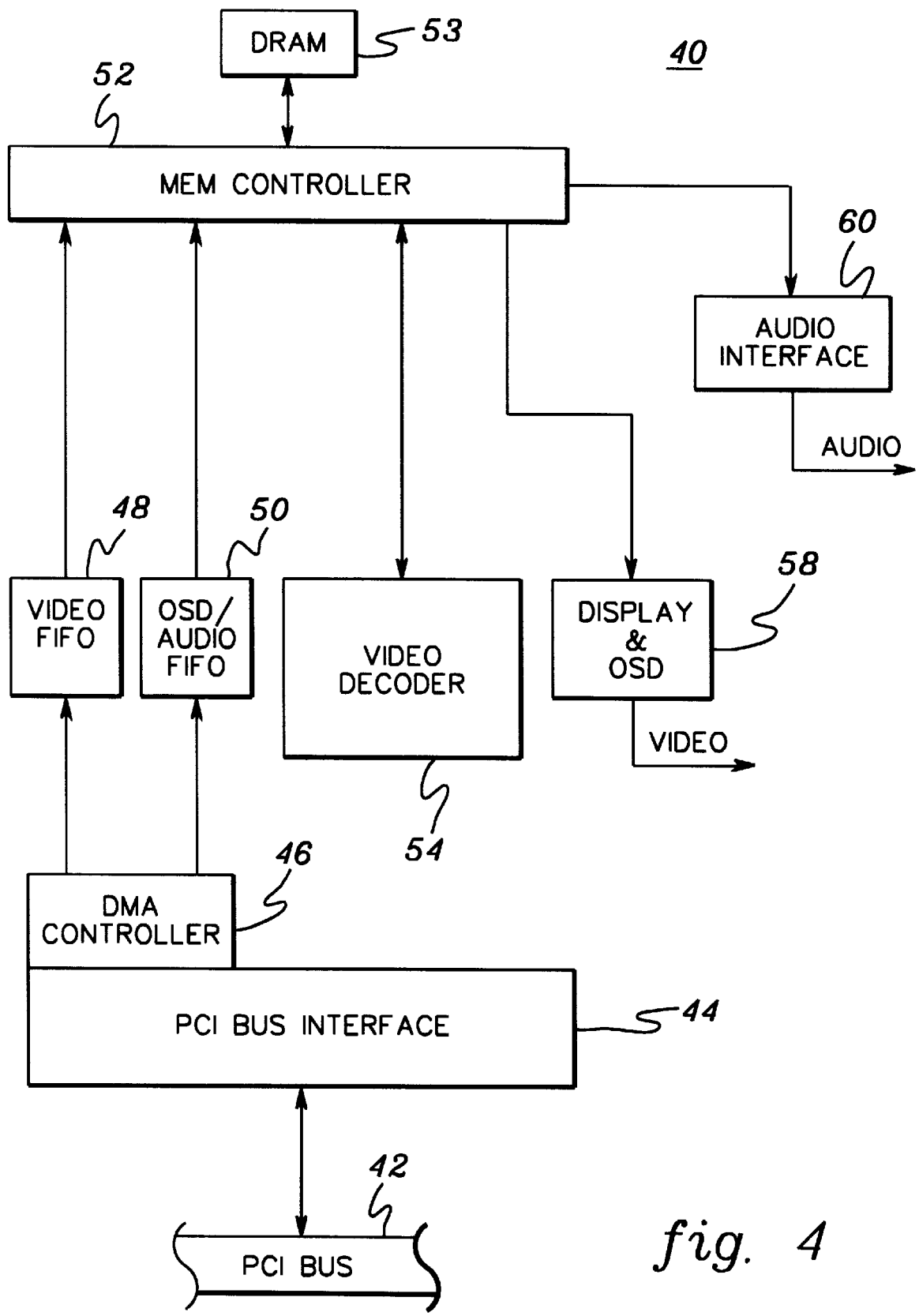
FIG. 4 is a block diagram of a video decoding system to employ the principles of the present invention.

A decode system, generally denoted 40, to employ the present invention is depicted in FIG. 4. System 40 includes a PCI bus interface 44 which couples the decode system 40 to a PCI bus 42. MPEG encoded video data is fetched from PCI bus 42 by a DMA controller 46 which writes the data to a video First-In/First-Out (FIFO) buffer 48. The DMA controller also fetches on-screen display and/or audio data from PCI bus 42 for writing to an OSD/audio FIFO 50. A memory controller 52 will place video data into a correct memory buffer within dynamic random access memory (DRAM) 53. MPEG compressed video data is then retrieved by the video decoder 54 from DRAM 53 and decoded as described above in connection with FIG. 3. Conventionally, the decoded video data is then stored back into the frame buffers of DRAM 53 for subsequent use as already described. When a reference frame is needed, or when video data is to be output from the decode system, stored data in DRAM 53 is retrieved by the MEM controller and forwarded for output via a display & OSD interface 58. Audio data, also retrieved by the memory controller 52, is output through an audio interface 60.

More specifically, this invention relates to decimation of the B-coded pictures as described in the above-incorporated application entitled: "Multi-Format Reduced Memory MPEG-2 Compliant Decoder". Briefly described, this decimation includes first motion compensating the P-coded, and B-coded pictures, followed by decimating the B-coded pictures during the decode phase, and increasing the size of the scan line fetches, i.e., the number of pixels fetched, for the I-coded and P-coded pictures to enable their horizontal decimation during the display phase.

A decimation unit is provided that operates on luminance and chrominance macroblock units of a picture at the time that the picture is being decoded, and thereafter operates on scan line units of picture data. Decimation is a process of reducing the amount of data by interpolating or averaging combined values to get an interpolated pixel value. Interpolation reduces the number of pixels and, therefore, less memory is required in the overall system. A diagram showing this decimation unit conceptually in an MPEG-2 decoder subsystem can be seen in FIG. 5.

Figure 5:
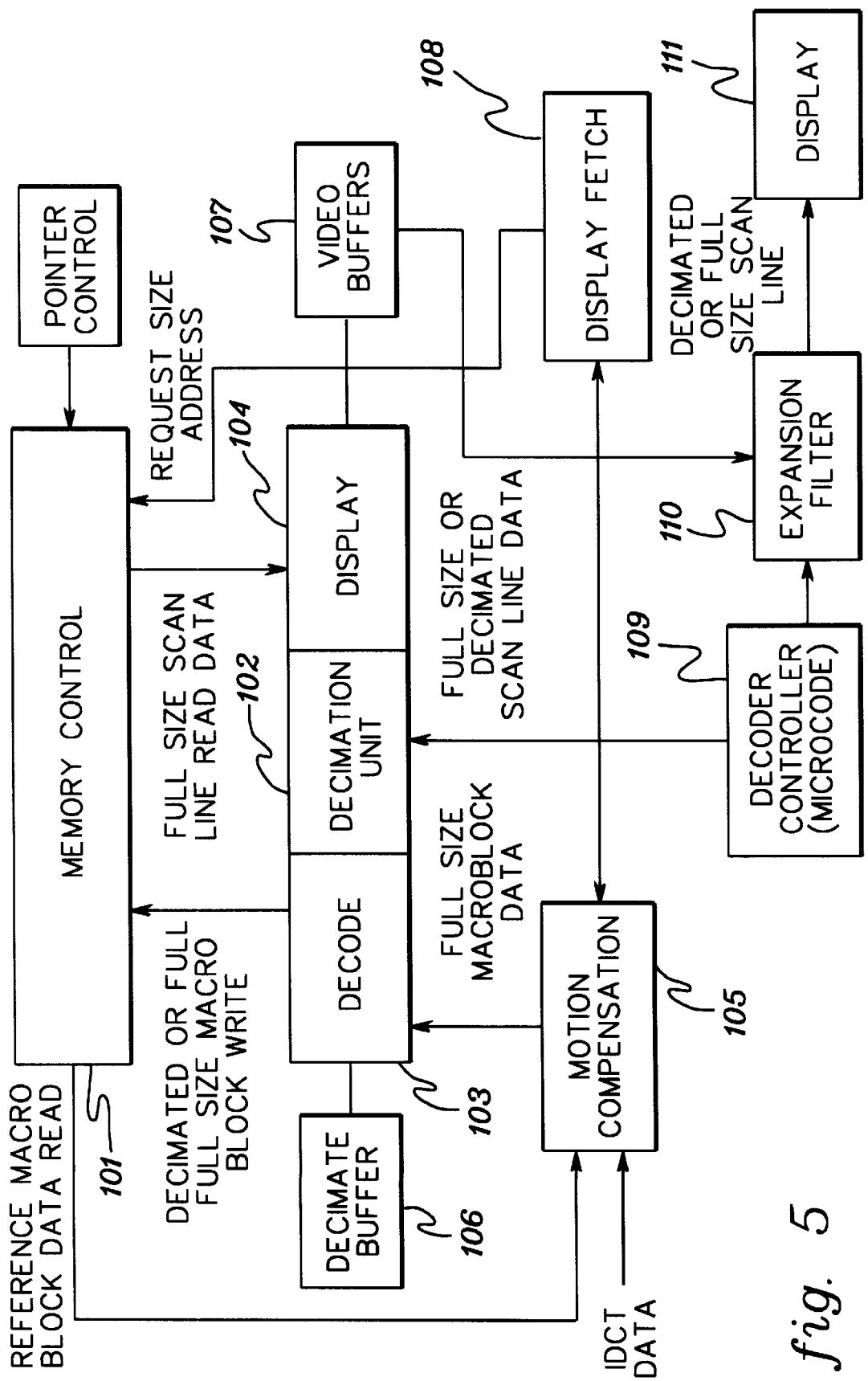
FIG. 5 depicts a decoder subsystem with decimation unit data paths. Data flows from motion compensation unit 105 to decode portion 103 of decimation unit 102. Decimate buffer 106 stores data before the data is routed to the memory control unit 101. From here, the data passes through the display portion 104 of decimation unit 102 with the aid of display fetch unit 108. Video buffer 107 then stores the data before it is passed through expansion filter 110 and then on to display 111. Decoder controller 109 controls and synchronizes the entire process.

FIG. 5 depicts an apparatus for decoding macroblock data in a digital video decoding system. The system includes a memory control unit 101 for receiving and processing the macroblock data, and for sending control signals for controlling the protocol of the flow of the macroblock data. The system also includes a motion compensation unit 105 for processing and receiving the macroblock data, a decimation unit 102 having a decoder portion 103, a display portion 104 and a decimate buffer 106. Further system components include a display fetch unit 108, an expansion filter 110, a decoder controller 109, at least one video buffer 107 and at least one multiplexor.

In the system shown in FIG. 5, macroblock data is processed by motion compensation unit 105 and then sent to memory control unit 101. However, before it reaches memory control unit 101, the macroblock data is intercepted and processed by decoder portion 103 of decimation unit 102. The data is then stored in decimate buffer 106 before passing to memory control unit 101. After memory control unit 101 receives and processes the macroblock data it is once again sent to decimation unit 102. Here, display portion 104 of decimation unit 102 receives the data and transfers it to video buffer 107 with the aid of display fetch unit 108. Display fetch unit 108 determines the size of scan line fetches for some picture types of scan line data. In order to expand the scanline data it must pass through expansion filter 110. As described further below, the present invention is directed to expansion filter 110.

Control signals are sent from memory control unit 101 to the motion compensation unit 105. However, these signals are intercepted enroute by decimation unit 102 and translated there before reaching their destination at motion compensation unit 105. The decoder controller 109 controls and synchronizes this decoding system.

Decode portion 103 of decimator unit 102 is capable of intercepting macroblock data that has been fully processed by motion compensation unit 105 before the macroblock data is written to memory control unit 101. Depending on the instructions to decimation unit 102, decimation unit 102 may allow a full size macroblock unit to continue writing without alteration, or decimate the macroblock according to a selectable algorithm. When no decimation is to be selected, memory control unit 101 controls the pace of the dataflow. When decimation is selected, decimation unit 102 translates the control signals from memory control unit 101, and generates new control signals to motion compensation unit 105. Decimation unit 102 then controls the data flowing to memory control unit 101 to allow decimation to occur. Decimation unit 102 independently controls the luminance and chrominance macroblock units.

It is advantageous to make the transfers to memory control unit 101 as efficient as possible in order to conserve total decoder memory bandwidth. Therefore, decimate buffer 106 is used by decimation unit 102 to collect data that can be sent in packets to memory control unit 101.

With this system, memory control unit 101 and motion compensation unit 105 are as previously described in U.S. Pat. No. 5,576,765 by Cheney et al. hereby incorporated by reference. Modifications are made in motion compensation unit 105 to reorder the data flow to memory for interlaced material carried in a frame structured macroblock. The transmission of data between motion compensation unit 105 and decimation unit 102 is such that the top field data is transmitted before the bottom field data. This removes the need for an extra or larger storage device in decimation unit 102.

Display portion 104 of decimation unit 102 in FIG. 5 operates when the decoded picture is being fetched from memory control unit 101 in scan line form with the intention of producing a raster scan stream of pixel data for display 111. Unlike motion compensation unit 105, display fetch unit 108 is coordinated with the actions of decimation unit 102, and alters the data fetch quantity so as to more appropriately keep video buffer 107 full while decimation unit 102 is operating. This is essential to maintain a seamless flow of pixels to display 111 and thus assure a high quality picture. Like decode portion 103 of decimation unit 102, display portion 104 uses the same set of algorithms to decimate the incoming picture. Display portion 104 operates independently of decode portion 103, and does not share any hardware resources.

The system in FIG. 5 is controlled and synchronized by decoder controller 109, such that all elements of the system coordinate to present a consistent picture. Decoder controller 109 provides control to enable applying a selected decimation algorithm to either the luminance data, or the chrominance data, or both.

Thus, with this flexible system, it is possible to perform a number of advantageous processes. One process is to create a "letterbox" presentation. This simple case allows the image to be vertically decimated by ¾, and this, as compared to a conventional 4:3 display monitor, creates a 16:9 "letterbox presentation." Decimation allows a 16:9 form factor motion picture image to be shown on a 4:3 form factor television screen without loss of the edges. In this case, the decoded I and P macroblocks proceed through decode portion 103 of decimation unit 102 unaltered, and the B macroblocks are vertically decimated in decode portion 103 of decimation unit 102. On the display side, display fetch unit 108 fetches I and P pictures, and fetches the scan lines in such a way as to allow vertical interpolation down to the same letterbox size as was performed by the decode side. The B picture scan lines would not need to go through this interpolation step, thus all I, P, and B pictures would smoothly display a letterbox picture sequence. This vertical decimation and vertical interpolation can be performed on luminance data only, chrominance data only, or on both luminance data and chrominance data.

"Memory space reduction" is a process which reduces the amount of memory space required for the storage of the decoded B frame, while maintaining high quality for the reference frames (I, P) so as to keep the quality of pictures, over the course of a group of pictures, from gradually declining. This is accomplished by horizontally decimating the B pictures 2:1 in the decoding stage. The I and P macroblocks proceed through decimation unit 102 unaltered. On the display side, the display fetch unit 108 increases the size of the scan line fetches for I and P pictures, and horizontally decimates these lines using a 2:1 decimation algorithm. The B picture scan lines need not go through this reduction step. When the I, P, and B lines in turn reach the expansion filter 110, the filter 110 is set to allow a 1:2 expansion, thus regaining I, P, and B lines original size. This process could be done to the luminance data, or the chrominance data, or both. The reduction and subsequent re-expansion of the I and P pictures by display portion 104 of decimation unit 102 is done so that consistency is maintained for the video of a group of pictures, and thus the reduced resolution of any one picture is not noticeable.

Another process is to perform both of the above described processes, and, at the same time. This creates a "letterbox" presentation and still affords saving of external frame buffer memory.

Yet another process is to create a small picture presentation, e.g., for displaying both graphics and text. In this mode, decode portion 103 of decimator unit 102 reduces the displayed image by ¾ vertically, employing the same or similar algorithms used for letterbox presentation. The remaining space on display 111 could be used for on-screen graphics. By additionally reducing B frames as described above, the required external memory to decode the video is reduced, allowing more of the external memory to be allocated toward on screen graphics, i.e. for resolution or color enhancement which could be utilized in this mode of operation.

With the above as reference, the present invention is more particularly described below. As noted, MPEG-2 video decoder/display functions may be required to transform the presentation aspect ratio of the decoded source video stream to fit the needs of the environment to which the function is installed.

The displayed output of the decoder chip must conform to CCIR recommendation 601. This specifies the number of luminance and chrominance pixels in a single active line, and also how the chrominance pixels are subsampled relative to the luminance signals. The format defined as 4:2:2 is supported in most cases in the industry. This defines 720 active luminance signals (Y), and 360 color difference signals (Cb, Cr pairs), where each line of luminance signals has a corresponding line of chrominance signals. CCIR recommendation 656 goes on to define the number of active lines for NTSC and PAL environments as 480 and 576, respectively.

Decoded MPEG-2 images may not conform to the full sized CCIR-601 resolution. For example, the input video may be formatted for 352 vertical columns of pixels, but these may need to be expanded to fill a 704 vertical column space on a video display (CRT). This is known as 1 to 2 expansion (1:2) because of the doubling of horizontally displayable pixels. This can be done by any of several methods well known to the art, including pixel repetition (repeating every pixel horizontally once), or averaging of adjacent pixels to produce a new pixel to be placed in between them. More complex methods involve use of a Finite Impulse Response (FIR) transfer function to create a convolution sum, and thus, a new pixel is interpolated from the analysis of several input pixels. The FIR method, when considering several input pixels at one time in the generation of a single output pixel, may use many coefficients as operands to multiply functions to participate in this convolution sum. This method is preferred when greater accuracy is desired in the resulting expanded video display, and is one preferred embodiment of the present invention.

While still employing the above discussed FIR method for horizontal expansion, the display function may be required to perform several different aspect ratio transformations. For example, 1:2, 3:4, 2:3 . . . , are common in the industry. Some video display functions are very cost sensitive, and it would be appropriate to design the horizontal expansion function to perform all of the required aspect ratio transformations with the same digital circuitry. This multiplexing of the digital circuitry is advantageous to reduce the amount of area required to implement the display function, because area, especially in VLSI implementations, is an important factor in determining the manufacturing cost of the decoder/display function. Recently, the inclusion of several different aspect ratio transformations into a single display function has become common, and as such, it is beneficial to pursue methods which reduce this area. Also, it has become common to these implementations to use a single set of coefficients, no matter what the desired aspect ratio transformation is to be. Thus, this further would reduce the area required to implement these functions.

As described above, it is believed an advantageous feature to be able to provide the MPEG-2 decoding function while at the same time reducing the amount of external memory required to store the decoded image. When the original image is decoded, it may be sub-sampled in several ways in order to reduce the space that the image will require for storage, two of which include simple decimation, and another by means of a digital filter. This implies a certain spatial locality of the reduced luminance and chrominance samples with respect to the original samples. When this image is post-processed by the display function during the eventual expansion back to the original size, this spatial relationship must be reconstructed as closely as possible. Otherwise, distortion can result in the form of a color shift. This is especially important for the MPEG-2 Pan/Scan feature, which requires sub-pixel accuracy. Thus, part of the present invention lies in such a display function wherein more accurate luminance and chrominance can be produced from the sub-sampled image when the horizontal expansion display function is returning the sub-sampled image back to it's original size, while not allowing the circuitry for this increased accuracy to be a burden to the rest of the design. The invention allows the MPEG-2 Pan/Scan feature to be utilized even though the original image may be sub-sampled in the interest of memory savings.

The chrominance difference signals are usually sub-sampled from the original image prior to the MPEG-2 encoding. The chrominance sampling format is specified according to the following:

4:2:0 chrominance difference signals are sub-sampled in one half the resolution of the luminance in both the vertical dimension and horizontal dimension.

4:2:2 chrominance difference signals are sub-sampled in one half the resolution of the luminance in the horizontal dimension only.

4:4:4 there is an equal number of luminance samples and chrominance difference samples.

For MPEG-2 main level, main profile, the compressed data consists of 4:2:0 chrominance. Most MPEG-2 decoders output the uncompressed video in 4:2:2 format. This is represented in FIG. 6 and FIG. 7. The horizontal position of the chrominance samples is co-located with the luminance samples for MPEG-2 4:2:2 format. A co-located sample is made by taking the same number of samples of chrominance as luminance pixels, but then decimating every other sample.

FIG. 8 depicts the horizontal position of MPEG-2 chrominance signals for 4:2:0. In MPEG-1, the chrominance samples for 4:2:0 are located "half-way" between the adjacent luminance samples as shown in FIG. 9.

One objective of this filtering is to re-sample the original pixels so that a section of less than a full size screen can be expanded to full size. In the MPEG-2 specification, this is known as the "Pan Scan" function, and is typically employed for video source material that is encoded in a 16-by-9 aspect ratio (movie screen) and needs to be altered for display on a 4-by-3 aspect ratio device (conventional television display). The other objective is to provide sub-pel accuracy for the pan scan function, which allows the encoder to adjust the starting position of the intended display picture relative to the decoded image at picture intervals. The MPEG-2 syntax allows for 1/16th pel accuracy, which is sufficient to show a smooth panning motion at commonly used rates of aspect ratio expansion.

The basic expansion is accomplished by first upsampling the original set of samples by a factor of 16, performing a convolution to interpolate or fill in the missing samples, and then decimating, or removing unwanted samples by a variable factor. The process treats the luminance (Y) and each color difference signal (U,V) independently, and the same convolution sum is applied to each set of samples to form a new line of digital data.

Figure 10:
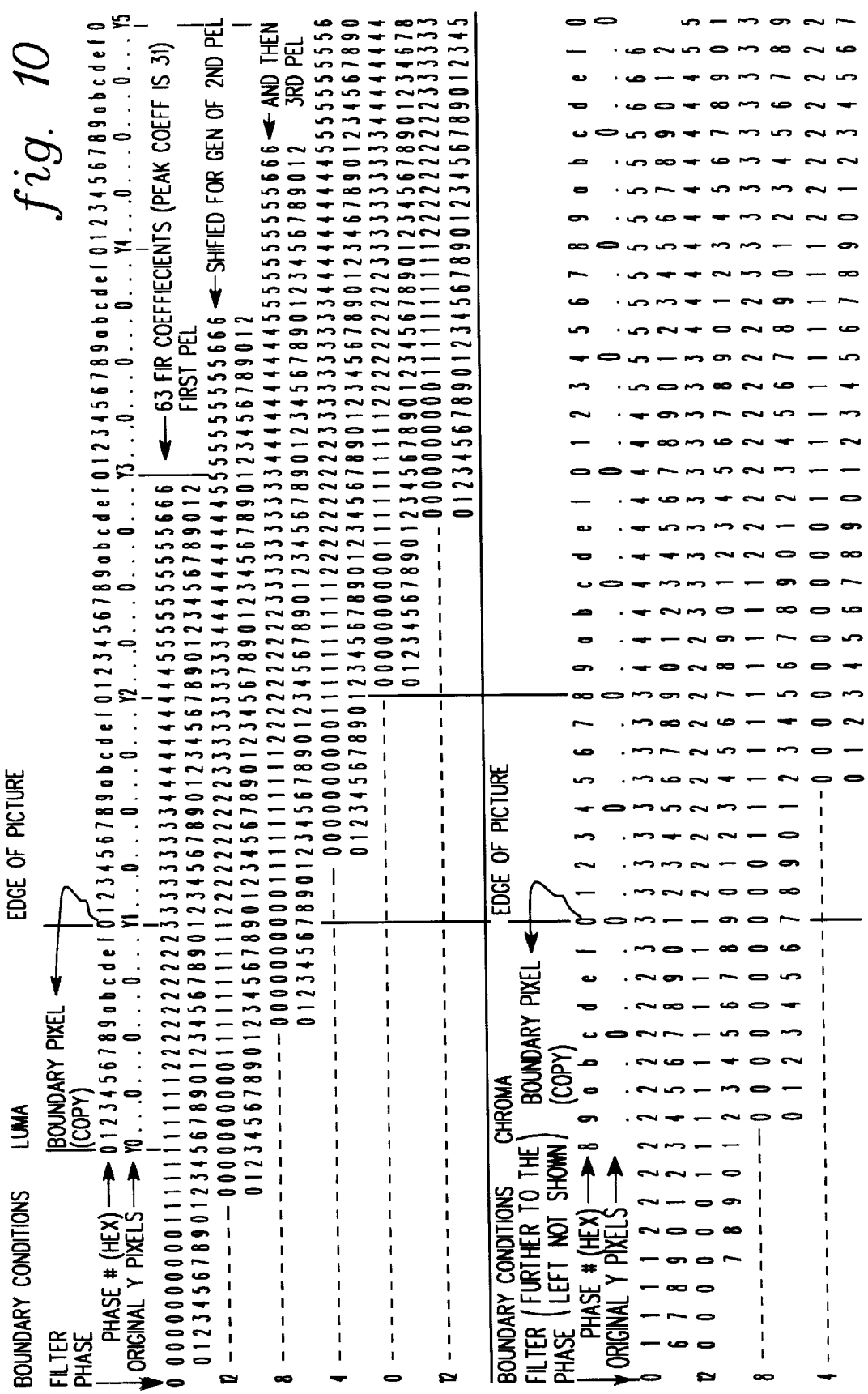
FIG. 10 shows the luminance and chrominance phase offsets for horizontal 12:16 filtering with a zero pan offset.

FIG. 10 shows this process by way of example. The samples are expanded by a rate of 12:16. For the luminance, at the start of the convolution, the peak, or center, of the filter is centered underneath the left boundary pixel. Initially at the start of a new line there will not be a value of Y(-0), so as an approximation, Y(0) will simply be repeated. The hardware implementation will only require the multiply/ summation step at intervals shown, and all other interval summations are discarded. The filter is capable of producing results with 1/16 pel accuracy with respect to the original samples, and this is illustrated in FIG. 10, where each 1/16 interval is assigned a "phase" number 0 through 15. In this filter implementation example, there are a maximum of 4 multiplies and 4 adds to create the new sample pixel, where the 4 pixels selected for the calculation are in closest proximity to the peak of the filter where an alignment with 4 of the 63 coefficients occurs. The coefficients aligned with the pixels participate in the multiply as the other operand. The pixel sub-interval, or "phase", that is aligned with the peak of the filter is said to be the "phase of the filter". In this case, the filter for Luma has a starting phase of "0". For the second generated pixel, the filter advances to a phase of 12 to facilitate the 12:16 expansion rate. Thus, the peak coefficient is now aligned 12 sub-intervals to the right. As the process continues the filter advances further to the right, each time advancing another 12 sub-intervals. This alignment of the original pixels is achieved by a set of shift registers, or any other shifting means known to the art. Note that between first and second set of samples, no shifting of the original pixels in the registers is required. The same 4 pixels produce the second sample as used to produce the first, only at a different phase.

The chrominance is processed independently, but in a similar fashion. Because the chrominance is sub-sampled in one half the resolution of the luminance, the sub-intervals between these samples need to be twice as large to maintain the 1/16 subpel MPEG-2 requirement. Also, because each generated pixel requires a chrominance difference, the filter must produce 2 values for each generated pixel. However, there is no difference in the transfer function between luminance and chrominance, since the same rate of expansion is used in both cases.

When the end of the line of original pixels is reached, a clamping circuit may be used to insure that pixel values not belonging to this horizontal line are not used in the computations for the current line. The last pixel will be repeated to approximate the missing samples required by the filter when the clamp is in effect.

The above example covers the case of 12:16 expansion for ease of understanding. However, the advancement between the phases can be computed to a much finer degree.

The above example uses a 12:16 expansions, or more accurately, 12.0:16. The expansion ratio may be implemented with as many guard bits as desired to achieve finer expansion control. It is common in the art to implement four guard bits, to complement the four bits needed to achieve 1/16 resolution control over the expansion. Thus, with eight bits total, we can set the filter to expansion ratios in 1/256 resolutions. For example, the filter expansion can be set to 12.15:16 instead of 12:16 and the next pixel to be calculated will be at phase 9.14 instead of 8 after a 1 pixel shift of the incoming pixel stream. The next generated pixel would be 6.13, and the next would be 3.12, and so on. The existence of these guard bits in the expansion ratio filter setting will be referred to as a variable filter.

In order to establish the correct initial conditions it is necessary for the circuit to use the least significant bits (or sub-pel bits) of the frame_centere_horizontal_offset (defined in the MPEG-2 specification) and to use the low order bit of the pan offset (computed from frame_centere_ horizontal_offset and outside the scope of this invention). For luminance (Y) there is no difference between starting with a pan offset at an odd pel or even pel boundary. For example, at offset 0.25 or 1.25, phase 4 will always be the starting phase of the filter for luminance. For chrominance there will be a difference. This is because of the relative position of the original chrominance (UV) samples to the starting offset by the fact that the chrominance is sub-sampled in one half the resolution of the luminance.

There is also a difference for chrominance if attempt is made to achieve spatial centering of the resulting chrominance with respect to the resulting luminance. In this regard, reference co-pending, commonly assigned patent application Ser. No. 08/616,327 by Cheney et al. entitled "Video Decoder Including Polyphase FIR Horizontal Filter," already incorporated herein by reference. The general equation for calculation of chrominance start phase based on UV sub-pel offset is:

uv start phase=(UV sub-pel offset/2)+sub-pel_delta
Where:
 sub_pel_delta=UV upsample rate/4

The sub_pel_delta term is the key to achieving the spatial centering of chrominance with respect to the resulting luminance. This is shown in FIG. 11.

The example shown in FIG. 12 comprises a complete start phase chart for 6.0:16 expansion based on the sub-pel offset. Note that the resultant chrominance pixels are centered between their associated luminance pixels. Also, note that if the sub-pel offset is large enough, an additional chrominance pel shift may be required before starting to maintain the alignment of the luminance and chrominance.

The Y start phase is easy to establish, in that it is simply the 4 sub-pel bits of the pan offset. However, the UV start phase is more difficult to establish. It is the establishment of these starting phases and subsequent processing of the filter (even though the original image may be sub-sampled in the interest of memory savings) that is one feature of an expansion filter in accordance with the present invention.

Certain unique features of an expansion filter comprising the present invention are next described below. As a means of saving memory space for the decoded pictures, an image may be compressed by some decimation factor by some means (outside the scope of this invention), and then a horizontal filter will expand it back to its original size by that same decimation factor. This expansion is in addition to any expansions that would normally take place as required by the MPEG-2 stream, including expansion for reduced resolution streams or pan scan enabled streams, and would require a dedicated filter circuit. Also, the MPEG-2 decoder chip controller (microcode) may choose to perform the said memory reduction to either the luma, the chroma, or both, requiring the dedicated circuit to have independent controls for luminance and chrominance.

Unique to this invention, when a memory reduced image is encountered, the original FIR filter will automatically divide the upsample rate by the decimation factor if the original picture size was large enough such that the picture has been decimated by upstream hardware processes.

A doubling expansion is achieved by shifting the value of the filter setting to the right by 1 bit, thus dividing the value by two. It is recommended that an extra filter setting guard bit be present when this action occurs so as not to experience any loss of expansion accuracy. This invention thus removes the need for a separate expansion filter in the display. For example, the FIR may change from 10.11:16 (a setting applicable to 480 pixel horizontal resolution) to 5.5:16.

As another aspect, the invention provides a more accurate horizontal expansion for reduced-memory MPEG digital video. The decimation to create the reduced-memory image can be performed by any means and is outside the scope of this invention. Common to this practice would be the use of a 1,1 averaging circuit for 2 pixels, thus reducing the image to one half horizontal resolution (HHR). Another choice might be to use a 1,1,1,1 averaging circuit for 4 pixels, thus reducing the image to one quarter horizontal resolution (QHR). The act of decimating the image with a HHR averaging filter creates an inherent ½ pel shift of the image to the left. This is uniquely countered in this invention by the FIR by performing a modulo 16 substraction of −4 from the starting phase. This phase correction is graphically depicted in FIG. 13.

However, the initialization of the filter pipeline registers with pixel data remains the same as if no decimation had occurred to simplify the logic and remove some of the design burden. Thus, when the reduction method is HHR averaging for luminance, the first shift of luminance pixel data may be suppressed. The value of the luminance offset address and the upsample rate help determine whether or not this first shift is suppressed. Due to the modulo 16 subtraction, the resulting phase is always positive and thus from the example, the starting phase for luminance is 12 rather than −4. The first luminance pixel generated under these conditions is not expected to be perfectly accurate because of this change of phase polarity without a corresponding change to the pixel fetching mechanism, but should get on track as soon as normal shifting begins. The importance of the accuracy of this first generated pixel is diminished by the conventional presence of external mattes on the display screen boundaries, covering these first pixels. Boundary pixel calculations are known to be inaccurate anyway due to the approximation of the n−1 pixel repetition.

The invention applies the same phase correction and first shift suppression to the chrominance if it was also reduced.

Figure 13:
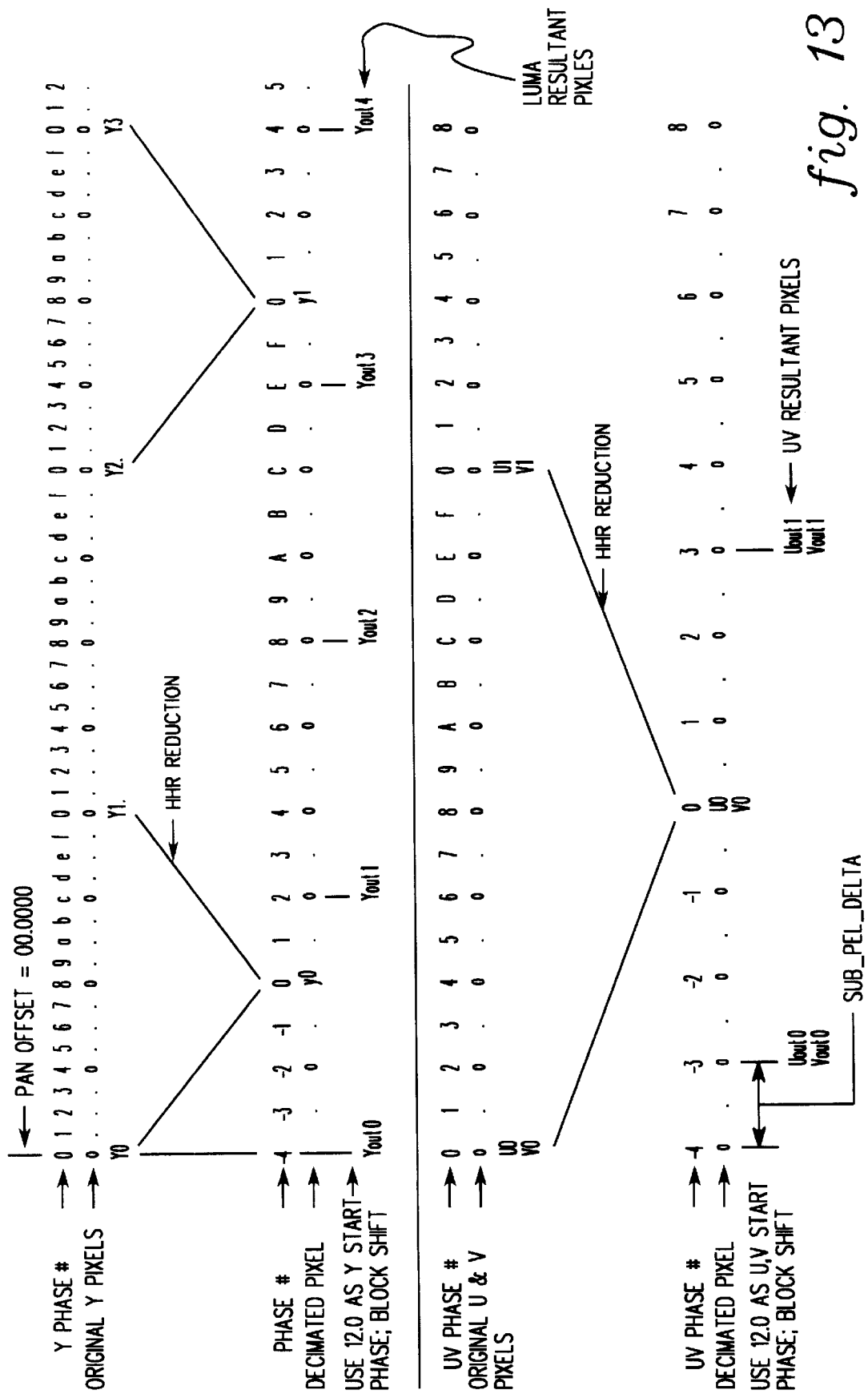
FIG. 13 shows phase correction for half horizontal resolution reduction using 12.0:16 expansion for both luminance and chrominance.

In FIG. 13, note also that the chrominance upsample amount has effectively changed from 12.0:16 to 6.0:16, because the variable filter will automatically divide the upsample rate by the decimation factor, in this case "2". Thus, when the sub_pel_delta=UV upsample/4 is calculated, a smaller sub_pel_delta results, in this case "1". Thus, another feature of this invention is that the new UV pixels are still centered approximately between the new Y pixels.

Depending on the algorithm used for the decimation, the FIR can be ready to handle many different values of phase shift.

Figure 14A:
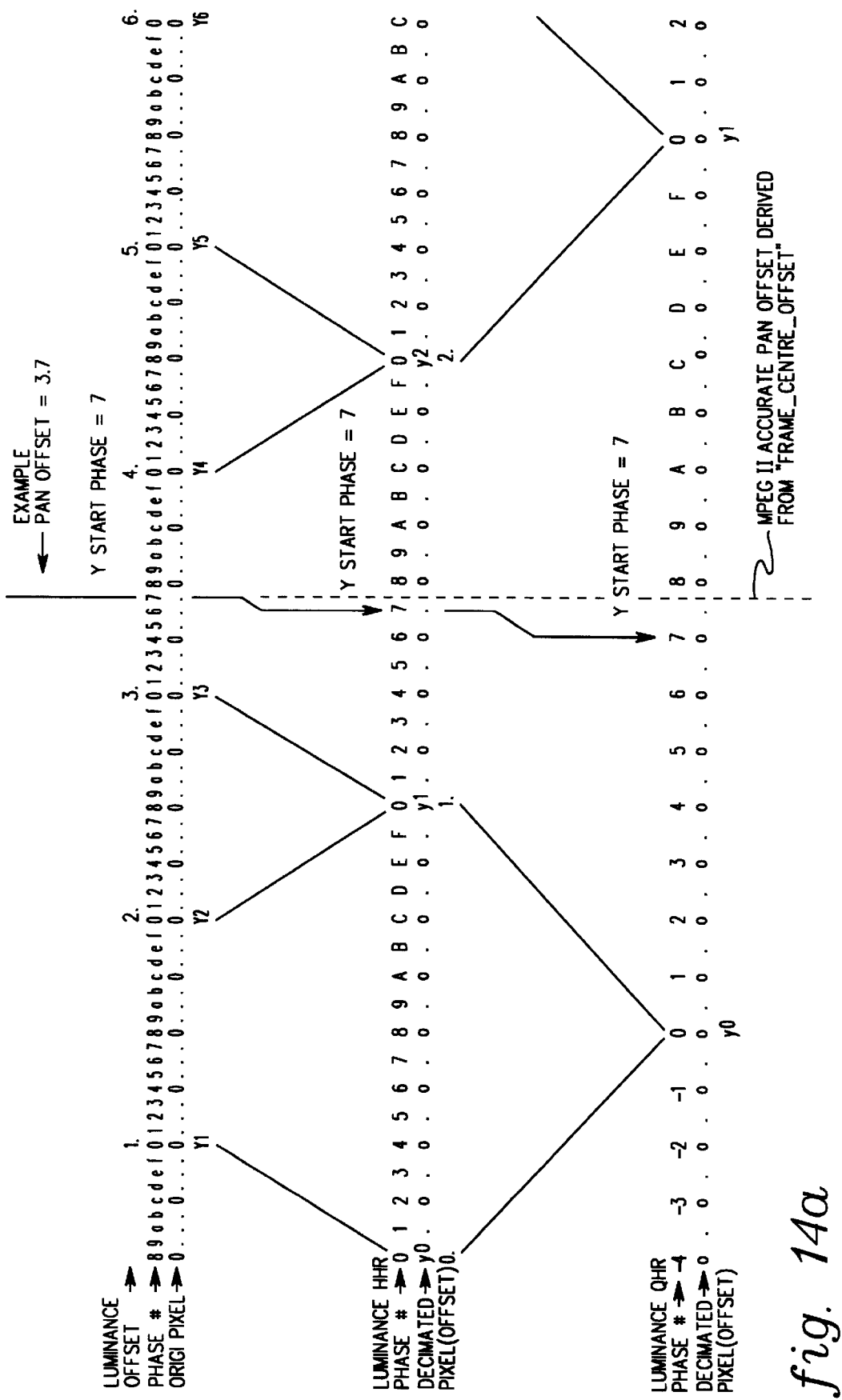
FIG. 14a depicts pan scan for half horizontal resolution memory reduction and quarter horizontal resolution memory reduction for luminance.
Figure 14B:
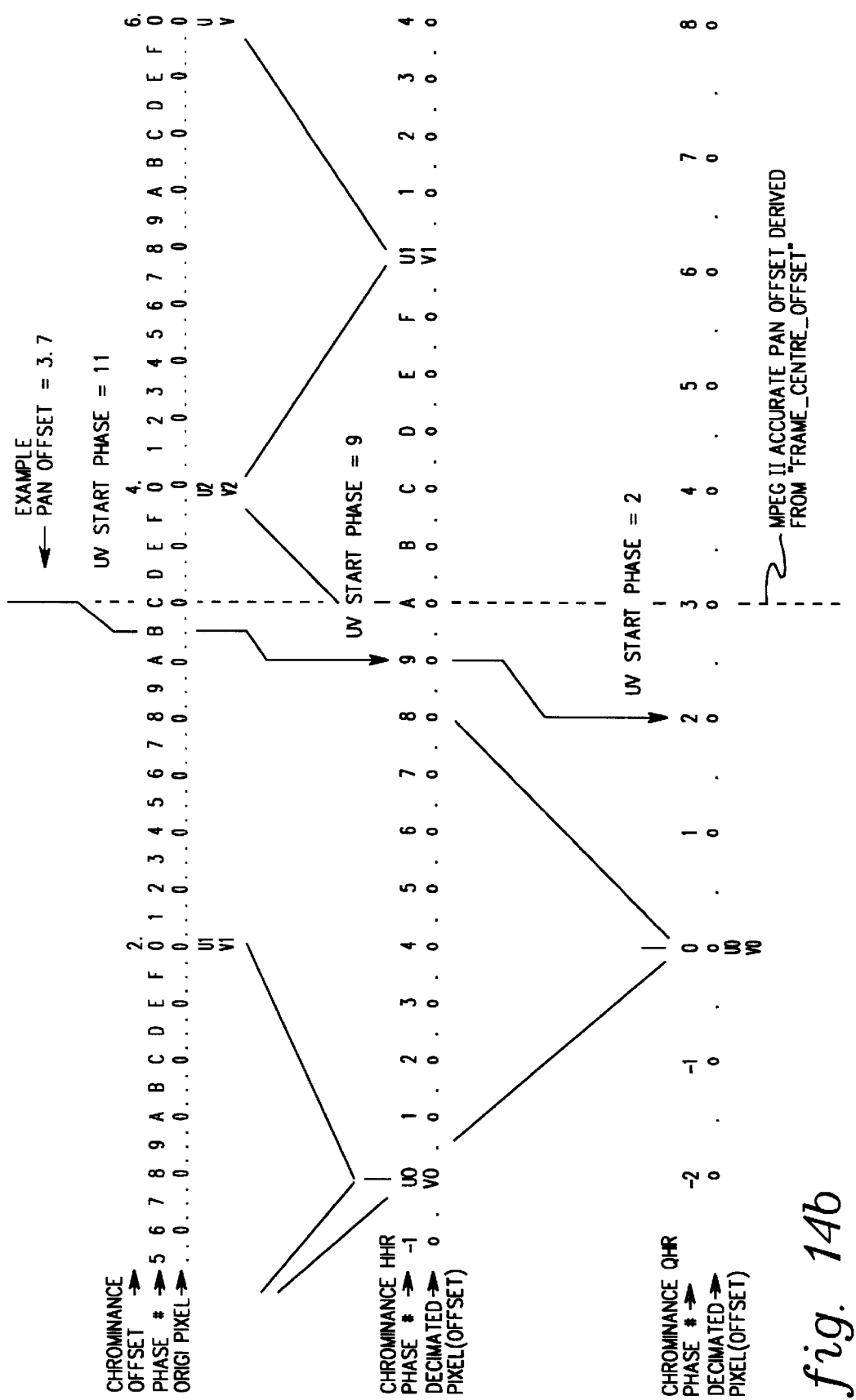
FIG. 14b depicts corresponding pan scan for half horizontal resolution memory reduction and quarter horizontal resolution memory reduction for chrominance.

FIG. 14 shows both cases of HHR reduction and QHR reduction. This particular figure shows a 1,1,1,1 decimation for Y having a −6 phase correction, as well as a 1,0,1,0 decimation for UV having a −4 phase correction. If the UV were to have a 1,1,1,1 decimation, it also would have a −6 phase correction. The example of pan offset=3.7 shows that as the offset is divided for the various decimations, the result is truncated. Also, note that this pan offset example does not illustrate the UV sub_pel_delta because this diagram is not specific to any one upsample rate.

Figure 15A:
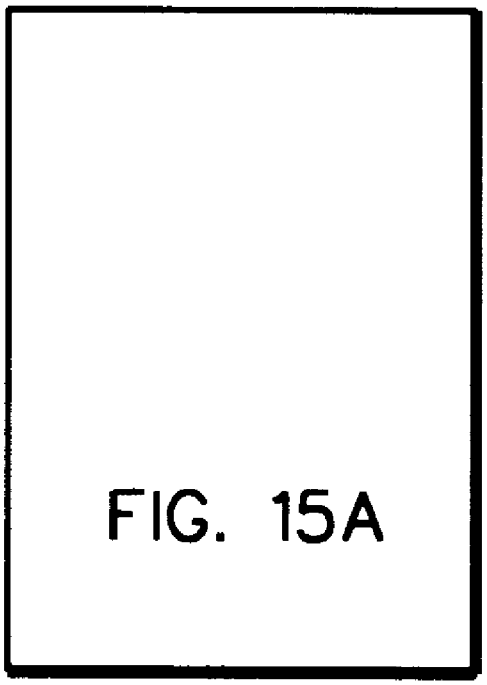
Figure 15B:
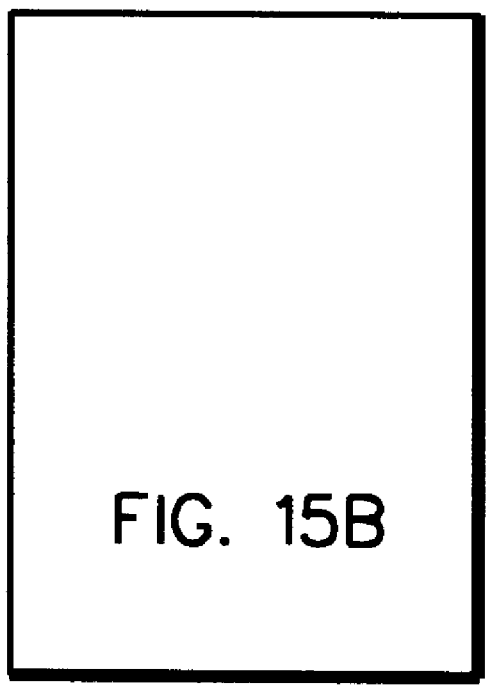
Figure 15A:
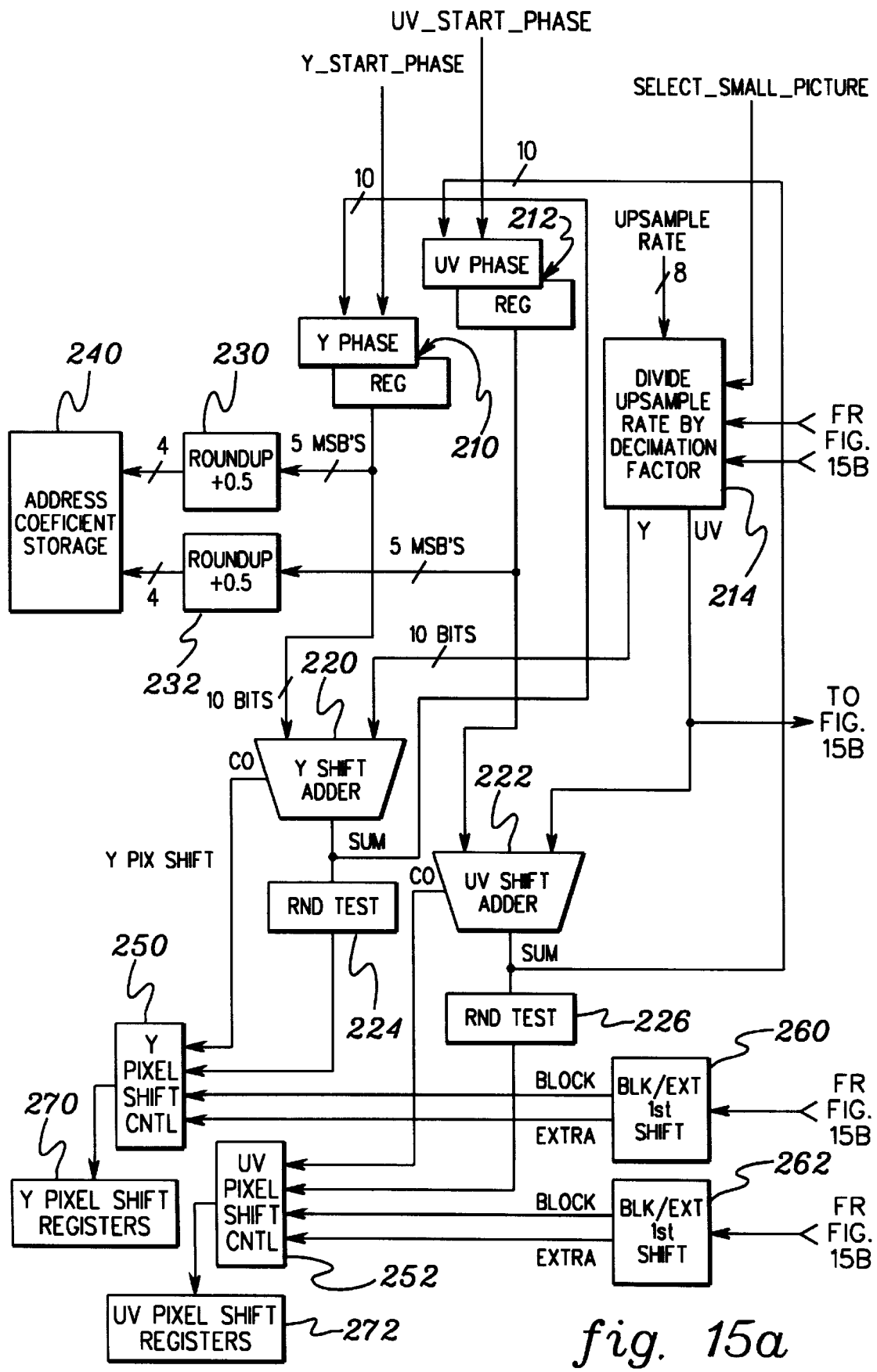
Figure 15B:
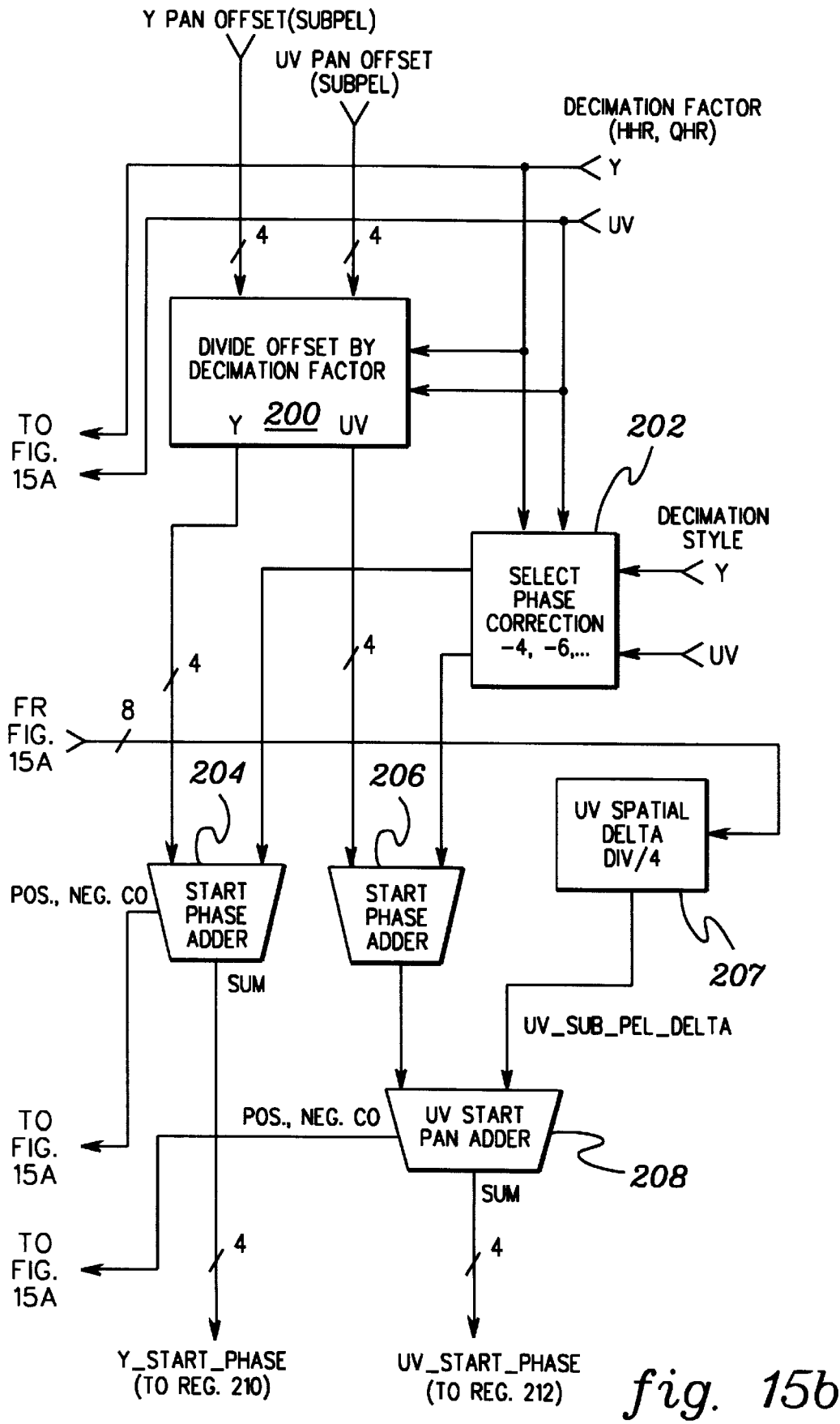

The circuit that can effectively implement the above unique features is shown in FIGS. 15, 15a & 15b (hereinafter referred to as FIG. 15). When the modulo adders for this base 16 expansion produce a carry out, the input pixel samples are shifted by one position. The Y phase and UV phase registers include all of the guard bits. However, only the 4 msb's are used to access the ¹⁄₁₆ pel accurate coefficient storage. The Rnd Test block is installed to reduce visible image distortion at very high expansion ratio filter settings.

Input to FIG. 15 includes a Y pan offset (subpel) and UV pan offset (subpel). These offsets are provided to a divide offset by decimation factor logic 200 which also receives the Y and UV decimation factors from the decimation unit via the decoder controller. The Y pan offset and UV pan offset are translations done by microcode on the decoder chip. These translations are derived from the frame_centere_ offset and are indicative of the address location in memory where the picture is to be cropped into. Within divide offset by decimation factor logic 200, the 4 bit sub-pel memory offsets are divided by the Y and UV decimation factors using a generic means for digital division. Two results are obtained for the divisions, where the offsets are the dividends and decimation factors are the divisors. The division is such that significance is lost in the operation. In the case of the diagram, where the divisors are limited to two for HHR and four for QHR, there are two guard bits present (i.e., the 9th and 10th bits in lbs positions) to maintain significance.

The Y and UV decimation factors are also forwarded to a select phase correction block 202, which also receives the decimation style from the decimation unit. Select phase correction 202 is table lookup logic involving predetermined phase corrections that are associated with the decimation amount and style used by the decimation unit. By way of example, decimation styles and decimation factors may be as follows:

| Decimation factor | Decimation style | Phase correction (decimal) |
|---|---|---|
| HHR | 1,0 = | 0.0 |
| HHR | 1,1 = | −4.0 |
| QHR | 1,1,1,1 = | −6.0 |
| QHR | 1,0,1,0 = | −4.0 |
| QHR | 1,1,0,0 = | −2.0 |

The Y and UV pan offsets divided by the decimation factor are respectively output to start phase adders 204 & 206. Adders 204 & 206 combine these outputs with the predefined phase correction output from select phase correction logic 202. As noted, the particular predefined phase correction will depend upon the amount and style of decimation employed by the decimation unit coupled to the decoder controller.

The sum of start phase adder 204 comprises the Y_start_ phase seed signal which is placed into Y phase registers 210. The sum from the chrominance start phase adder 206 is further added in a UV start pan adder 208 to a UV_sub_pel_delta derived by UV spatial delta block 207. This UV_sub_pel_delta signal comprises the upsample rate divided by the decimation factor further divided by 4 by a right shifter. The shifted out bits are dropped in this process. The output from adder 208 comprises the UV_start_phase signal which is seeded to UV phase registers 212.

Y phase register 210 and UV phase register 212 function as accumulators for the results of the independent additions of the divided Y and UV decimation factors. The inputs to these registers thus include the Y_start_phase and UV_start_phase signals as well as feedbacks from Y shift adder 220 and UV shift adder 222, respectively. The divide upsample rate by decimation factor block 214 receives as input the upsample rate, as well as the Y and UV decimation factors and a select_small_picture control signal.

The divided upsample rate comprises a Y signal and a UV signal each 10 bits in length. More particularly, the 8 bit upsample rate is divided by the decimation factors using a generic means for digital division. Two results are obtained for the divisions, where the upsample_rate is the dividend and decimation factors are the two divisors. The division is such that no significance is lost in the operation. In FIG. 15, where the divisors are limited to two for HHR and four for QHR, there are two guard bits present (i.e., the 9th and 10th bits in lbs positions) to maintain significance. If the select_small_picture signal is active, then the divisors are forced to 1. The Y and UV output signals are sent to Y shift adder 220 and UV shift adder 222, respectively.

Output from the Y phase register 210 and UV phase register 212 is also sent to a respective round up block 230 & 232. In particular, 0.5 (decimal) is added to the five most significant bits output by the Y phase and UV phase registers. The resulting four most significant bits are then used as address to coefficients in address coefficient storage 240. By way of example, storage 240 may include an n×16 array of coefficients, where "n" equals the number of coefficients needed to produce a new pixel. The Y and UV coefficients retrieved using these addresses are forwarded to the Y pixel shift registers 270 and the UV pixel shift registers 272, respectively. Thus, this logic chooses a phase to act as the current coefficient selection to handle the current set of pixels that are in the shift registers 270 & 272.

As noted, output from Y shift adder 220 and UV shift adder 222 is sent to a respective round test block 224 & 226. The round test blocks test the results of the respective adders to see whether the value is 15.5 (decimal) or greater. If true, the output of RND test is activated. This output is forwarded to either a Y pixel shift control 250 or a UV pixel shift control 252. The carryouts "CO" from adders 220 & 222 are also forwarded to Y pixel shift control 250 & UV pixel shift control 252, respectively.

Block and extra signals from respective block/extra first shift 260 and block/extra first shift 262 logic are also input to shift controls 250 & 252. Input to logic 260 & 262 comprises the carryout bits from the start phase adder 204 and the UV start pan adder 208, respectively. These carryouts can be thought of as positive and negative. If the result is positive, and there is a carryout, then the "extra" signal is activated. If the result is negative, and there is a carryout, then the "block" signal is activated. At shift controls 250 & 252 if the carryout of the Y/uv shift adders is activated, then the pixels are shifted once in Y/UV pixel shift registers 270, 272. If the RND test is activated, then the pixels are shifted once, and the next shift to be caused by the carryout of the Y/UV shift adders is suppressed. If the extra signal input is activated, an extra shift is applied to the shift registers before the filtering process begins. If the block signal input is activated, then the first regular shift to the shift registers 270, 272 is suppressed.

As another feature in accordance with the principles of the present invention, the decoder controller may desire to not re-expand the decimated picture, but instead to display the smaller image. For example, the decoder chip may be operating in a "small picture" mode, in which case the decoded image has been reduced and is sent to the display as a smaller sized picture. Here, the action taken by the same filter is not to expand the image to full size, but to filter high-frequency effects from the picture that may have been created by the decimation process. In this mode, the filter_setting internal to the FIR will be forced to 16.0:16, and the phase will be held steady at the value of the phase correction +16 in order to cause a filtering effect. This value will allow the resultant Y values to be in phase with the associated UV values. The filter will be set in this mode only if the filter is not already needed for a pan scan or other expansion of the small picture required by the MPEG-2 syntax. This unique feature eliminates the need for a special anti-aliasing filter thus reducing the overall cost of the design, while improving the "small picture" quality.

To summarize, the automatic adjustment of expansion and phase compensation aspects of the present invention provide a more accurate reconstruction of the picture originally decoded by the MPEG-2 digital video decoder system. While the enhancements presented herein are precise, being accurate to the sub-pel level, which may not be visible to the average consumer, an MPEG-2 decoder chip manufacturer delivers to many different types of digital video system manufacturers. Therefore, this additional accuracy provided by the present invention may be a deciding factor in achieving commercial success. In the related aspect of high frequency filtering, an expansion filter in accordance with this invention functions to save chip area. By reusing the expansion filter already included in the digital video decoder system as a high frequency filter, especially in cases where the size parameters of the input MPEG stream do not require any rescaling, the cost of a special filter otherwise needed for pre-conditioning the input to the decimation process is avoided. In this case, the expansion filter at the output approximates the pre-conditioning high frequency filter effect.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

I claim:

1. An expansion filter for expanding decimated macroblock data within a digital video decoding system employing a macroblock data decimation unit for decimating decoded macroblock data pursuant to a decimation factor, said expansion filter comprising:

a variable filter for expanding said decimated macroblock data, said variable filter receiving said decimated macroblock data and being coupled to said macroblock data decimation unit for receiving said decimation factor used by said macroblock data decimation unit in decimating said macroblock data; and wherein said variable filter for expanding said decimated macroblock data comprises means for automatically adjusting expansion of said decimated macroblock data using said decimation factor received from said macroblock data decimation unit.

2. The expansion filter of claim 1, wherein said variable filter expands decimated macroblock data using a defined upsample ratio, and wherein said means for automatically adjusting expansion by said variable filter comprises means for dividing said upsample ratio by said decimation factor to arrive at an adjusted upsample ratio for use in expanding said decimated macroblock data.

3. The expansion filter of claim 1, wherein said variable filter comprises a polyphase, finite impulse response horizontal filter.

4. The expansion filter of claim 1, wherein said decimated macroblock data comprises at least one of decimated luminance data or decimated chrominance data and said decimation factor comprises at least one of a corresponding luminance decimation factor or chrominance decimation factor, and wherein said variable filter comprises means for independently handling said at least one decimated luminance data and decimated chrominance data using said at least one corresponding luminance decimation factor and chrominance decimation factor.

5. The expansion filter of claim 1, wherein said expansion filter includes a predefined phase correction used in expanding said decimated macroblock data based upon said decimation factor employed by said macroblock data decimation unit, said predefined phase correction ensuring spatial accuracy of macroblock data output from said expansion filter.

6. The expansion filter of claim 5, wherein said macroblock data decimation unit employs a decimation style in decimating said macroblock data, and wherein said expansion filter comprises means for employing said decimation factor and said decimation style in selecting one phase correction from multiple predefined phase corrections accessible by said expansion filter for use in expanding said decimated macroblock data, said one phase correction ensuring spatial accuracy of the macroblock data produced by said expansion filter.

7. A digital video decoding system for decoding macroblock data, comprising:

a memory control unit for receiving and processing said macroblock data;

a motion compensation unit for processing said macroblock data pursuant to received control signals;

a decimation unit coupled to said motion compensation unit and said memory control unit for translating said macroblock data using a decimation factor, said decimation unit producing decimated macroblock data; and an expansion filter coupled to receive said decimated macroblock data, said expansion filter comprising:

a variable filter for expanding said decimated macroblock data, said variable filter being coupled to said decimation unit for receiving said decimation factor used by said decimation unit in decimating said macroblock data, and wherein said variable filter for expanding said decimated macroblock data comprises means for automatically adjusting expansion of said decimated macroblock data using said decimation factor received from said decimation unit.

8. The digital video decoding system of claim 7, wherein said variable filter comprises a polyphase, finite impulse response horizontal filter.

9. The digital video decoding system of claim 7, wherein said variable filter further comprises a predefined phase correction used in expanding said decimated macroblock data based upon said decimation factor employed by said macroblock data decimation unit, said predefined phase correction ensuring spatial accuracy of macroblock data output from said expansion filter.

10. The digital video decoding system of claim 9, wherein said macroblock data decimation unit employs a decimation style in decimating said macroblock data, and wherein said variable filter comprises means for employing said decimation factor and said decimation style in selecting one phase correction from multiple predefined phase corrections accessible by said expansion filter for use in expanding said decimated macroblock data, said one phase correction ensuring spatial accuracy of macroblock data produced by said expansion filter.

11. A digital video decoding system comprising:

a macroblock data decimation unit for decimating macroblock data after decoding thereof, said decimating being pursuant to a decimation factor; and an expansion filter for expanding decimated macroblock data, said expansion filter being coupled to said macroblock data decimation unit for receiving the decimation factor used by said macroblock data decimation unit in decimating said macroblock data, wherein said expansion filter includes a predefined phase correction used in expanding said decimated macroblock data based upon said decimation factor employed by said macroblock data decimation unit, said predefined phase correction ensuring spatial accuracy of macroblock data output from said expansion filter.

12. The digital video decoding system of claim 11, wherein said macroblock data decimation unit employs a decimation style in decimating said macroblock data, and wherein said expansion filter comprises means for employing said decimation factor and said decimation style in selecting one phase correction from multiple predefined phase corrections accessible by said expansion filter for use in expanding said decimated macroblock data, said one phase correction ensuring spatial accuracy of the macroblock data produced by said expansion filter.

13. The digital video decoding system of claim 12, wherein said expansion filter further comprises means for expanding said decimated macroblock data by shifting said decimated macroblock data and means for suppressing said shifting during generating of at least one expanded first pixel for each row of macroblock data.

14. The digital video decoding system of claim 13, wherein said decimated macroblock data comprises at least one of decimated luminance data or decimated chrominance data.

15. The digital video decoding system of claim 13, wherein said macroblock data decimation unit comprises at least one of a half horizontal resolution (HHR) averaging circuit or a quarter horizontal resolution (QHR) averaging circuit.

16. The digital video decoding system of claim 13, wherein said spatial accuracy ensured by said predefined phase correction comprises approximate centering of new chrominance pixels between new luminance pixels.

17. A digital video decoding system comprising:

a video decoder controller for controlling decimation and re-expansion of macroblock data;

a macroblock data decimation unit for decimating original macroblock data after decoding thereof; and a filter coupled to said macroblock data decimation unit and to said video decoder controller, said filter operating as an expansion filter or as a high frequency filter pursuant to control signals received from said video decoder controller, wherein said expansion filter approximately returns said decimated macroblock data to original macroblock data, and wherein said high frequency filter filters high frequency effects from said decimated macroblock data.

18. The digital video decoding system of claim 17, wherein said expansion filter comprises a variable filter for expanding said decimated macroblock data, said variable filter comprising means for automatically adjusting expansion of said decimated macroblock data using a decimation factor employed by said macroblock data decimation unit in producing decimated macroblock data from said original macroblock data, said decimation factor being received from said macroblock data decimation unit.

19. The digital video decoding system of claim 18, wherein said expansion filter further includes a predefined phase correction used in expanding said decimated macroblock data based upon said decimation factor employed by said macroblock data decimation unit, said predefined phase correction ensuring spatial accuracy of macroblock data output from said expansion filter.

20. The digital video decoding system of claim 17, wherein said associated display unit comprises a display screen of a high definition television.

21. A method for processing macroblock data within a digital video decoding system, said method comprising:

decoding macroblock data;

employing a macroblock data decimation unit to decimate decoded macroblock data using a decimation factor, said decimating producing decimated macroblock data; and employing a variable filter for expanding said decimated macroblock data, said employing of the variable filter including receiving said decimated macroblock data at the variable filter and receiving at the variable filter said decimation factor employed by said macroblock data decimation unit, said employing of the variable filter including expanding said decimated macroblock data by automatically adjusting expansion of the decimated macroblock data using the decimation factor received from the macroblock data decimation unit.

22. The method of claim 21, wherein said employing of said variable filter for expanding said decimated macroblock data comprises using a defined upsample ratio to expand said decimated macroblock data, and wherein said automatically adjusting expansion of the decimated macroblock data comprises dividing said upsample ratio by said decimation factor to arrive at an adjusted upsample ratio for use in expanding said decimated macroblock data.

23. The method of claim 21, wherein said employing of the variable filter for expanding said decimated macroblock data further comprises employing a predefined phase correction within the variable filter in expanding said decimated macroblock data based upon said decimation factor employed by said macroblock data decimation unit, said predefined phase correction ensuring spatial accuracy of macroblock data output from said variable filter.

24. A method for processing macroblock data within a digital video decoding system, said method comprising:

decoding macroblock data;

decimating said decoded macroblock data employing a decimation factor, said decimating producing decimated macroblock data; and expanding said decimated macroblock data, said expanding including receiving said decimation factor employed in said decimating of said macroblock data and based thereon using a predefined phase correction in expanding said decimated macroblock data, said predefined phase correction ensuring spatial accuracy of macroblock data produced by said expanding.

25. The method of claim 24, wherein said decimating includes employing a decimation style in decimating said macroblock data, and wherein said expanding comprises selecting one phase correction from multiple predefined phase corrections based upon said decimation factor and said decimation style of said decimating, wherein said one selected phase correction ensures spatial accuracy of the macroblock data produced.

26. The method of claim 25, wherein said expanding of said decimated macroblock data comprises shifting said decimated macroblock data, and suppressing said shifting during generating of at least one expanded first pixel for each row of macroblock data.

27. A method for processing macroblock data within a digital video decoding system having a video decoder controller for controlling decimation and re-expansion of decoded macroblock data, said method comprising:

decimating macroblock data after decoding thereof to produce decimated macroblock data; and employing a common filter within said digital video decoding system to operate either as an expansion filter or as a high frequency filter pursuant to control signals received from said video decoder controller, wherein when said filter comprises an expansion filter, said method comprises employing said filter to expand said decimated macroblock data, and wherein when said filter operates as a high frequency filter, said method comprises employing said filter to filter high frequency effects from said decimated macroblock data.

28. The method of claim 27, wherein when said filter comprises an expansion filter, said method comprises automatically adjusting expansion of said decimated macroblock data by said expansion filter using a decimation factor employed in decimating said decoded macroblock data, and wherein said expanding includes employing a phase correction in expanding said decimated macroblock data at said expansion filter, said phase correction ensuring spatial accuracy of macroblock data output.

29. The method of claim 27, further comprising employing said filter to filter high frequency effects from said decimated macroblock data when said digital video decoder system is sending said decimated macroblock data to an associated display unit for display in decimated form.

* * * * *